US012767509B2

(12) United States Patent
Puszkiewicz et al.

(10) Patent No.: US 12,767,509 B2
(45) Date of Patent: Oct. 20, 2026

(54) VEHICLE WITH PENDULUM AXLES

(71) Applicant: Oshkosh Corporation, Oshkosh, WI (US)

(72) Inventors: Ignacy Puszkiewicz, Oshkosh, WI (US); Matt Gilbride, Oshkosh, WI (US); Rob Messina, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

(21) Appl. No.: 18/927,810

(22) Filed: Oct. 25, 2024

(65) Prior Publication Data

US 2025/0136423 A1 May 1, 2025

Related U.S. Application Data

(60) Provisional application No. 63/650,280, filed on May 21, 2024, provisional application No. 63/593,367, filed on Oct. 26, 2023.

(51) Int. Cl.
*B66F 11/04* (2006.01)

(52) U.S. Cl.
CPC .................................. *B66F 11/046* (2013.01)

(58) Field of Classification Search
CPC ............... B66F 11/046; B66F 9/07586; B60G 2200/44; B60G 2300/022
See application file for complete search history.

(56) References Cited

U.S. PATENT DOCUMENTS

| | | | | |
|---|---|---|---|---|
| 3,387,726 A * | 6/1968 | Mckee | B62D 49/0607 | 414/458 |
| 3,773,348 A * | 11/1973 | Davis | B60G 9/02 | 267/64.15 |
| 4,265,326 A * | 5/1981 | Lauber | E02F 9/04 | 180/8.3 |
| 4,395,191 A * | 7/1983 | Kaiser | E02F 9/085 | 180/7.1 |

(Continued)

FOREIGN PATENT DOCUMENTS

| | | | |
|---|---|---|---|
| BE | 1029747 A1 * | 4/2023 | B60B 35/002 |
| CN | 205855937 U | 1/2017 | |

(Continued)

OTHER PUBLICATIONS

International Search Report and Written Opinion issued in connection with PCT/US2024/053135 dated Jan. 28, 2025.

*Primary Examiner* — Jessica L Laux
*Assistant Examiner* — Kathleen M. McFarland
(74) *Attorney, Agent, or Firm* — Foley & Lardner

(57) ABSTRACT

A lift device includes a lift base, a turntable supported on and rotatably coupled to the lift base, a boom assembly coupled to the turntable, a platform coupled to the boom assembly so that the boom assembly is configured to selectively raise and lower the platform assembly, and a plurality of tractive elements. Each of the plurality of tractive elements is coupled to the lift base by a carrier arm and a pendulum axle assembly. Each of the pendulum axle assemblies includes a pendulum linkage that is pivotally coupled between a respective one of the carrier arms and a respective one of the plurality of tractive elements. Each of the pendulum axle assemblies defines a steering axis that is centered along the respective one of the plurality of tractive elements.

13 Claims, 18 Drawing Sheets

(56) References Cited

U.S. PATENT DOCUMENTS

| | | | | |
|---|---|---|---|---|
| 4,823,899 | A * | 4/1989 | Ron | B62D 7/1509 180/422 |
| 5,137,101 | A * | 8/1992 | Schaeff | B62D 57/00 180/8.1 |
| 5,722,504 | A * | 3/1998 | Gaetani | B60G 21/073 280/98 |
| 6,293,579 | B1 * | 9/2001 | Schaeff | B66F 11/044 180/209 |
| 6,443,687 | B1 * | 9/2002 | Kaiser | E02F 9/024 180/209 |
| 7,198,278 | B2 * | 4/2007 | Donaldson | B62D 49/08 180/209 |
| 7,690,448 | B2 * | 4/2010 | Yamanaka | B60B 37/00 180/23 |
| 9,174,488 | B2 * | 11/2015 | Berry | B60B 35/10 |
| 9,499,348 | B2 * | 11/2016 | Teichrob | B62D 7/06 |
| 10,562,364 | B2 * | 2/2020 | Crook | B62D 5/26 |
| 11,608,126 | B2 * | 3/2023 | Sobotka | B66F 11/044 |
| 11,780,282 | B2 * | 10/2023 | Gao | B60K 7/00 280/5.514 |
| 2002/0185850 | A1 | 12/2002 | Puszkiewicz et al. | |
| 2004/0045768 | A1 | 3/2004 | Puszkiewicz et al. | |
| 2004/0129491 | A1 * | 7/2004 | Bean | B60B 35/003 180/21 |
| 2004/0218997 | A1 | 11/2004 | Neubauer et al. | |
| 2007/0035109 | A1 * | 2/2007 | Yamanaka | B62D 61/12 280/727 |
| 2013/0020775 | A1 | 1/2013 | Beji | |
| 2013/0233645 | A1 | 9/2013 | Hao et al. | |
| 2014/0327221 | A1 * | 11/2014 | Berry | B60B 35/10 280/124.128 |
| 2015/0144426 | A1 | 5/2015 | Hao et al. | |
| 2015/0259185 | A1 * | 9/2015 | Ditty | B66F 11/046 182/19 |
| 2016/0075543 | A1 | 3/2016 | Lombardo et al. | |
| 2016/0221812 | A1 | 8/2016 | Puszkiewicz et al. | |
| 2017/0253221 | A1 | 9/2017 | Verhoff et al. | |
| 2017/0291802 | A1 | 10/2017 | Hao et al. | |
| 2017/0291805 | A1 | 10/2017 | Hao et al. | |
| 2018/0162704 | A1 | 6/2018 | Hao et al. | |
| 2018/0251354 | A1 | 9/2018 | Mohlman et al. | |
| 2018/0333987 | A1 * | 11/2018 | Ratcliffe | B60G 3/14 |
| 2019/0039868 | A1 | 2/2019 | Puszkiewicz et al. | |
| 2019/0071291 | A1 | 3/2019 | Puszkiewicz et al. | |
| 2019/0077646 | A1 | 3/2019 | Puszkiewicz et al. | |
| 2019/0119088 | A1 | 4/2019 | Puszkiewicz et al. | |
| 2019/0177140 | A1 | 6/2019 | Gilbride et al. | |
| 2019/0185077 | A1 | 6/2019 | Smith et al. | |
| 2019/0185301 | A1 | 6/2019 | Hao et al. | |
| 2019/0210855 | A1 | 7/2019 | Hao et al. | |
| 2019/0322321 | A1 | 10/2019 | Schwartz et al. | |
| 2019/0322512 | A1 | 10/2019 | Puszkiewicz et al. | |
| 2019/0351883 | A1 | 11/2019 | Verhoff et al. | |
| 2019/0352157 | A1 | 11/2019 | Hao et al. | |
| 2020/0031641 | A1 | 1/2020 | Puszkiewicz et al. | |
| 2020/0316816 | A1 | 10/2020 | Messina et al. | |
| 2020/0317083 | A1 | 10/2020 | Messina et al. | |
| 2020/0317279 | A1 | 10/2020 | Mastronardi et al. | |
| 2020/0317486 | A1 | 10/2020 | Puszkiewicz et al. | |
| 2020/0346547 | A1 | 11/2020 | Rocholl et al. | |
| 2021/0002112 | A1 | 1/2021 | Puszkiewicz et al. | |
| 2021/0031611 | A1 | 2/2021 | Yakes et al. | |
| 2021/0031612 | A1 | 2/2021 | Yakes et al. | |
| 2021/0031649 | A1 | 2/2021 | Messina et al. | |
| 2021/0155463 | A1 | 5/2021 | Hao et al. | |
| 2021/0221216 | A1 | 7/2021 | Yakes et al. | |
| 2021/0229755 | A1 | 7/2021 | Schwartz et al. | |
| 2021/0276423 | A1 | 9/2021 | Lombardo et al. | |
| 2021/0276845 | A1 | 9/2021 | Gilbride et al. | |
| 2021/0276848 | A1 | 9/2021 | Miller et al. | |
| 2021/0279991 | A1 | 9/2021 | Shankar et al. | |
| 2021/0323763 | A1 | 10/2021 | Koga et al. | |
| 2021/0323764 | A1 | 10/2021 | Koga et al. | |
| 2021/0323765 | A1 | 10/2021 | Koga et al. | |
| 2021/0325529 | A1 | 10/2021 | Koga et al. | |
| 2021/0325911 | A1 | 10/2021 | Koga et al. | |
| 2021/0327164 | A1 | 10/2021 | Koga et al. | |
| 2021/0345062 | A1 | 11/2021 | Koga et al. | |
| 2021/0362696 | A1 | 11/2021 | Verhoff et al. | |
| 2021/0362697 | A1 | 11/2021 | Verhoff et al. | |
| 2021/0370893 | A1 | 12/2021 | Verhoff et al. | |
| 2021/0370894 | A1 | 12/2021 | Verhoff et al. | |
| 2021/0373560 | A1 | 12/2021 | Koga et al. | |
| 2021/0380085 | A1 | 12/2021 | Verhoff et al. | |
| 2021/0380179 | A1 | 12/2021 | Smith et al. | |
| 2021/0395058 | A1 | 12/2021 | Hao et al. | |
| 2022/0009338 | A1 | 1/2022 | Yakes et al. | |
| 2022/0033181 | A1 | 2/2022 | Koga et al. | |
| 2022/0097527 | A1 | 3/2022 | Koga et al. | |
| 2022/0097961 | A1 | 3/2022 | Koga et al. | |
| 2022/0097964 | A1 | 3/2022 | Koga et al. | |
| 2022/0135385 | A1 | 5/2022 | Lombardo et al. | |
| 2022/0144226 | A1 | 5/2022 | Verhoff et al. | |
| 2022/0144227 | A1 | 5/2022 | Verhoff et al. | |
| 2022/0176765 | A1 * | 6/2022 | Gao | B60K 7/0007 |
| 2022/0176921 | A1 | 6/2022 | Verhoff et al. | |
| 2022/0185582 | A1 | 6/2022 | Koga et al. | |
| 2022/0185643 | A1 | 6/2022 | Messina et al. | |
| 2022/0194333 | A1 | 6/2022 | Verhoff et al. | |
| 2022/0194334 | A1 | 6/2022 | Verhoff et al. | |
| 2022/0234554 | A1 | 7/2022 | Verhoff et al. | |
| 2022/0234555 | A1 | 7/2022 | Verhoff et al. | |
| 2022/0234873 | A1 | 7/2022 | Miller et al. | |
| 2022/0289152 | A1 | 9/2022 | Verhoff et al. | |
| 2022/0315404 | A1 | 10/2022 | Mohlman et al. | |
| 2022/0332556 | A1 | 10/2022 | Kobel et al. | |
| 2023/0002152 | A1 | 1/2023 | Koga et al. | |
| 2023/0049763 | A1 | 2/2023 | Messina et al. | |
| 2023/0089417 | A1 | 3/2023 | Koga et al. | |
| 2023/0092520 | A1 | 3/2023 | Verhoff et al. | |
| 2023/0130029 | A1 | 4/2023 | Schwartz et al. | |
| 2023/0142225 | A1 | 5/2023 | Kobel et al. | |
| 2023/0183050 | A1 | 6/2023 | Puszkiewicz et al. | |
| 2023/0184934 | A1 | 6/2023 | Koga et al. | |
| 2023/0202301 | A1 | 6/2023 | Rocholl et al. | |
| 2023/0202590 | A1 | 6/2023 | Mastronardi et al. | |
| 2023/0234456 | A1 | 7/2023 | Messina et al. | |
| 2023/0234462 | A1 | 7/2023 | Messina et al. | |
| 2023/0234821 | A1 | 7/2023 | Messina et al. | |
| 2023/0241960 | A1 | 8/2023 | Yakes et al. | |
| 2023/0256849 | A1 | 8/2023 | Messina et al. | |
| 2023/0264931 | A1 | 8/2023 | Tressler et al. | |
| 2023/0264932 | A1 | 8/2023 | Puszkiewicz | |
| 2023/0271816 | A1 | 8/2023 | Hao et al. | |
| 2023/0278842 | A1 | 9/2023 | Mohlman et al. | |
| 2023/0294528 | A1 | 9/2023 | Messina et al. | |
| 2023/0294763 | A1 * | 9/2023 | Lawson, Jr. | B62D 7/142 180/409 |
| 2023/0294915 | A1 | 9/2023 | Koga et al. | |
| 2023/0303321 | A1 | 9/2023 | Koga et al. | |
| 2023/0312317 | A1 | 10/2023 | Puszkiewicz et al. | |
| 2023/0322537 | A1 | 10/2023 | Puszkiewicz et al. | |
| 2023/0356402 | A1 | 11/2023 | Brulo et al. | |
| 2023/0356942 | A1 | 11/2023 | Koga et al. | |
| 2023/0356992 | A1 | 11/2023 | Brulo et al. | |
| 2023/0417899 | A1 | 12/2023 | Kobel et al. | |
| 2024/0001764 | A1 | 1/2024 | Koga et al. | |
| 2024/0025490 | A1 | 1/2024 | Brulo et al. | |
| 2024/0025714 | A1 | 1/2024 | Brulo et al. | |
| 2024/0028027 | A1 | 1/2024 | Puszkiewicz et al. | |
| 2024/0030863 | A1 | 1/2024 | Brulo et al. | |
| 2024/0043253 | A1 | 2/2024 | Kobel et al. | |
| 2024/0059537 | A1 | 2/2024 | Lombardo et al. | |
| 2024/0075815 | A1 | 3/2024 | Koga et al. | |
| 2024/0083729 | A1 | 3/2024 | Messina et al. | |
| 2024/0092620 | A1 | 3/2024 | Gilbride et al. | |
| 2024/0111290 | A1 | 4/2024 | Koga et al. | |
| 2024/0124073 | A1 | 4/2024 | Schwartz et al. | |
| 2024/0161552 | A1 | 5/2024 | Koga et al. | |
| 2024/0228251 | A1 | 7/2024 | Mohlman et al. | |
| 2024/0286831 | A1 | 8/2024 | Koga et al. | |
| 2024/0288873 | A1 | 8/2024 | Koga et al. | |
| 2024/0300734 | A1 | 9/2024 | Koga et al. | |

(56) References Cited

U.S. PATENT DOCUMENTS

| | | | |
|---|---|---|---|
| 2024/0308832 A1 | 9/2024 | Shankar et al. | |
| 2024/0317040 A1 | 9/2024 | Yakes et al. | |
| 2024/0343106 A1 | 10/2024 | Yakes et al. | |
| 2024/0343324 A1 | 10/2024 | Smith et al. | |
| 2024/0375924 A1 | 11/2024 | Puszkiewicz et al. | |
| 2024/0391742 A1 | 11/2024 | Hao et al. | |
| 2024/0391746 A1 | 11/2024 | Hao et al. | |
| 2024/0399919 A1 | 12/2024 | Messina et al. | |
| 2024/0400301 A1 | 12/2024 | Koga et al. | |
| 2024/0400361 A1 | 12/2024 | Puszkiewicz et al. | |
| 2024/0409309 A1 | 12/2024 | Koga et al. | |
| 2025/0011147 A1 | 1/2025 | Brulo et al. | |
| 2025/0304195 A1 * | 10/2025 | Tan | B62D 9/00 |

FOREIGN PATENT DOCUMENTS

| | | | | |
|---|---|---|---|---|
| DE | 19634897 C1 | * | 9/1997 | B62D 7/04 |
| EP | 1 577 159 A1 | | 9/2005 | |
| KR | 20220117744 A | * | 8/2022 | B60K 7/0007 |
| WO | WO-2019192648 A1 | * | 10/2019 | F16C 35/063 |
| WO | WO-2024130307 A1 | * | 6/2024 | B60G 17/0165 |

* cited by examiner

VEHICLE WITH PENDULUM AXLES

CROSS-REFERENCE TO RELATED PATENT APPLICATIONS

This application claims the benefit of and priority to U.S. Provisional Patent Application No. 63/650,280, filed May 21, 2024, and U.S. Provisional Patent Application No. 63/593,367, filed Oct. 26, 2023, each of which is incorporated herein by reference in its entirety.

BACKGROUND

Vehicles typically include a chassis that supports one or more tractive elements (e.g., wheels, tracks, etc.).

SUMMARY

According to some embodiments a lift device includes: a lift base; a turntable supported on and rotatably coupled to the lift base; a boom assembly coupled to the turntable; a platform coupled to the boom assembly so that the boom assembly is configured to selectively raise and lower the platform; and a plurality of tractive elements, each being coupled to the lift base by: a carrier arm; and a pendulum axle assembly, wherein each of the carrier arms is coupled to the lift base and rotatably coupled to a respective one of the pendulum axle assemblies, wherein each of the pendulum axle assemblies includes a pendulum linkage that is pivotally coupled between a respective one of the carrier arms and a respective one of the plurality of tractive elements, and wherein each of the pendulum axle assemblies defines a steering axis that is centered relative to the respective one of the plurality of tractive elements.

According to some embodiments a lift device includes: a lift base; a turntable supported on and rotatably coupled to the lift base; a boom assembly coupled to the turntable; a platform coupled to the boom assembly so that the boom assembly is configured to selectively raise and lower the platform; a carrier arm coupled to the lift base; a tractive element coupled to the carrier arm, wherein the tractive element includes a dual-wheel assembly; and a pendulum axle assembly coupled between the carrier arm and the tractive element, the pendulum axle assembly includes a pendulum linkage that is pivotally coupled between the carrier arm and the dual-wheel assembly, and wherein the pendulum axle assembly defines a steering axis that is centered relative to the dual-wheel assembly.

According to some embodiments a pendulum axle assembly for a lift device includes: a pendulum plate coupled to a carrier arm of the lift device; a pendulum linkage pivotally coupled between the pendulum plate and a tractive element, so that a steering axis defined between the pendulum plate and the tractive element is centered over the tractive element; and a pendulum actuator coupled between the pendulum plate and the pendulum linkage, wherein the pendulum actuator is configured to selectively adjust a distance between the tractive element and the carrier arm along a vertical direction.

The invention is capable of other embodiments and of being carried out in various ways. Alternative exemplary embodiments relate to other features and combinations of features as may be generally recited in the claims.

BRIEF DESCRIPTION OF THE DRAWINGS

The invention will become more fully understood from the following detailed description taken in conjunction with the accompanying drawings wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle (e.g., a lift device, a crane, an excavator, an agricultural vehicle, or any other vehicle that includes a wheel base that expands and retracts) includes a pendulum axle assembly coupled between a tractive element (e.g., a wheel) and a base or frame. In general, each of the wheels on the vehicle is coupled to a pendulum axle assembly and a carrier arm.

Each of the pendulum axle assemblies includes a pendulum linkage that enables the wheels of the vehicle to vertically adjust (e.g., in a direction perpendicular to a ground that the vehicle travels) and follow a ground (e.g., over bumps and dips/holes). Additionally, each of the pendulum axles is coupled to a respective one of the carrier arms so that a steering axis defined along the coupling between the pendulum axle and the carrier arm is centered over the respective wheel. In this way, for example, the pendulum axles may define a steering geometry with zero rolling radius because the steering axis remains vertical and centered above the wheels. In some embodiments, each of the carrier arms is pivotally coupled to the base so that the pendulum axles and the wheels may expand and retract the carrier arms.

Figure 1:
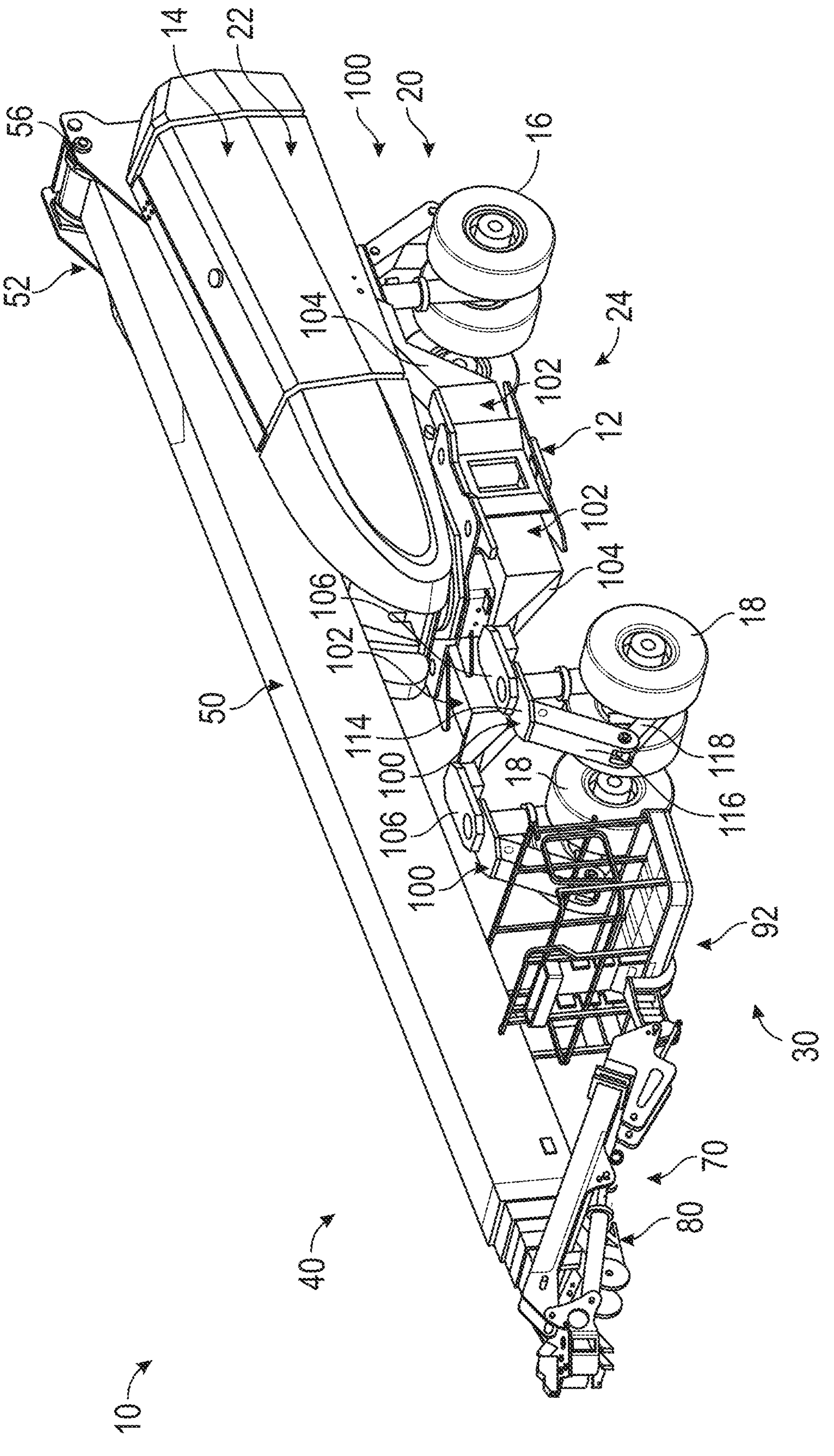
FIG. 1 is a perspective view of a life device having a pendulum axle assembly, with the pendulum axle assembly in an elevated position, according to an exemplary embodiment.
Figure 2:
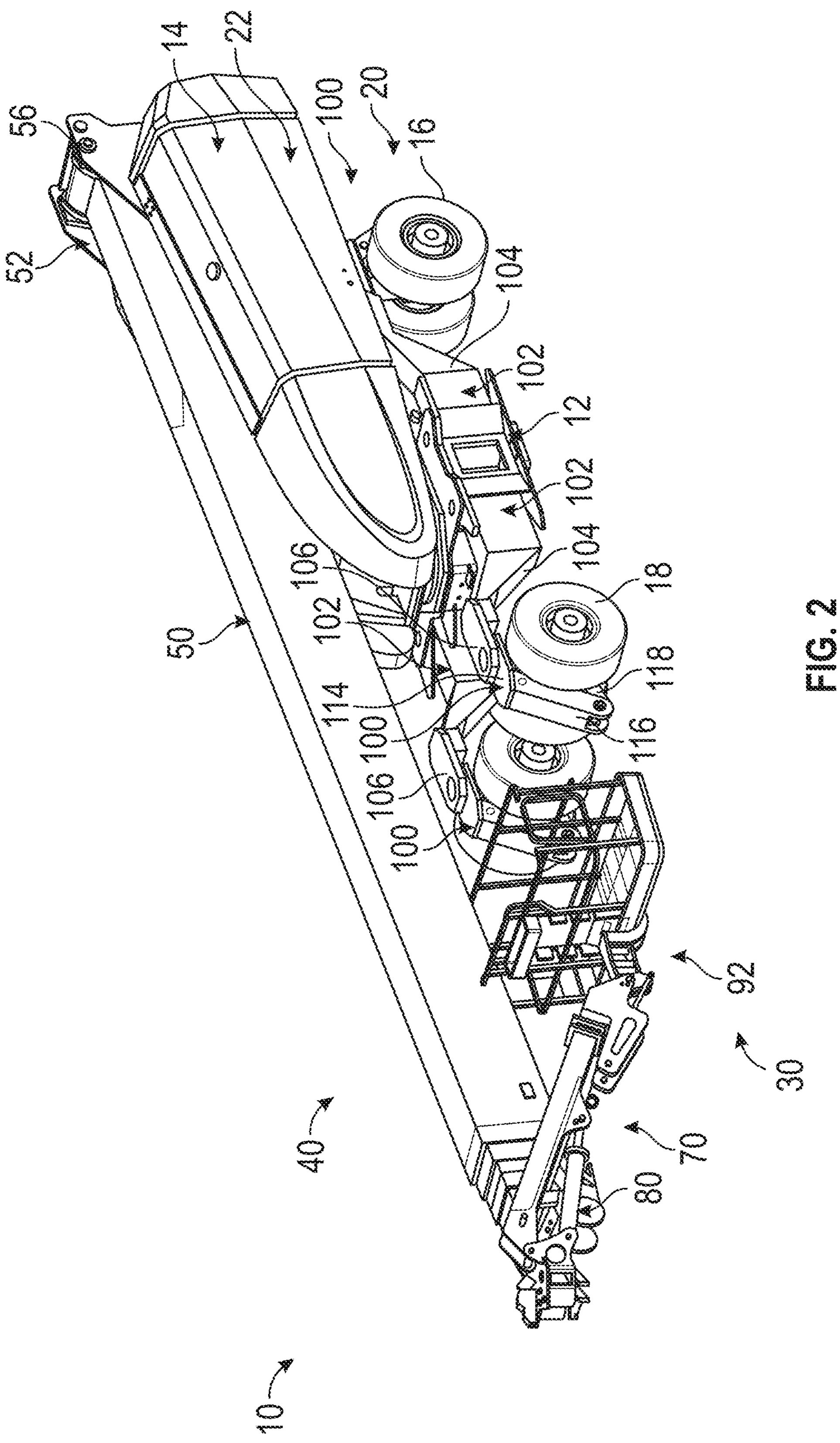
FIG. 2 is a perspective view of the life device of FIG. 1, with the pendulum axle assembly in a stowed position, according to an exemplary embodiment.

According to the exemplary embodiment shown in FIG. 1, a vehicle (e.g., a lift device, an aerial work platform, a telehandler, a boom lift, a scissor lift, etc.), shown as lift device 10, includes a chassis, shown as lift base 12. In other embodiments, the lift device 10 is another type of vehicle (e.g., a fire apparatus, a military vehicle, an airport rescue fire fighting ("ARFF") truck, a boom truck, a refuse vehicle, a fork lift, a crane, an excavator, an agricultural vehicle, etc.). The lift base 12 supports a rotatable structure, shown as turntable 14, and a boom assembly or telescoping boom, shown as boom 40. According to an exemplary embodiment, the turntable 14 is rotatable relative to the lift base 12. According to an exemplary embodiment, the turntable 14 includes a counterweight 22 positioned at a rear of the turntable 14. In other embodiments, the counterweight 22 is otherwise positioned and/or at least a portion of the weight thereof is otherwise distributed throughout the lift device 10 (e.g., on the lift base 12, on a portion of the boom 40, etc.). A first end, shown as front end 20, of the lift base 12 is supported by a first plurality of tractive elements, shown as front tractive elements 16, and an opposing second end, shown as rear end 30, of the lift base 12 is supported by a second plurality of tractive elements, shown as rear tractive elements 18. According to the exemplary embodiment shown in FIG. 1, the front tractive elements 16 and the rear tractive elements 18 include wheels. In other embodiments, the front tractive elements 16 and/or the rear tractive elements 18 include a track element/assembly.

As shown in FIG. 1, the boom 40 is coupled to a jib 70 at a distal end of the boom 40. By way of example, the boom 40 may include a plurality of telescoping boom sections that are configured to extend and retract along a longitudinal centerline thereof to selectively increase and decrease a length of the boom 40. In other embodiments, the boom 40 may include one or more sections that articulate with respect to one another (e.g., an articulating boom).

Figure 14:
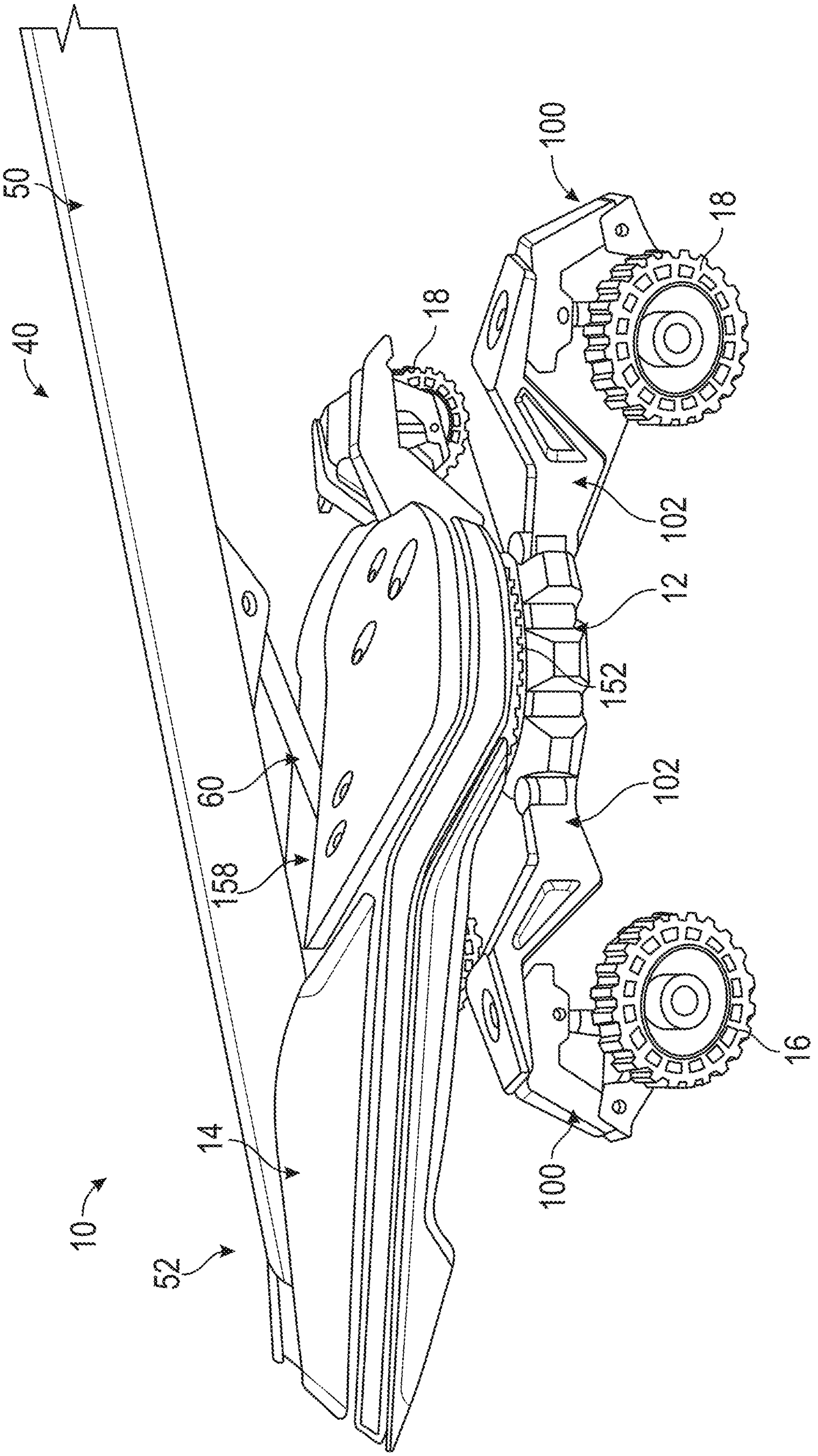

As shown in FIG. 1, the boom 40 has a first end (e.g., lower end, etc.), shown as base end 52, and an opposing second end, shown as intermediate end 54. According to an exemplary embodiment, the base end 52 of the boom 40 is pivotally coupled (e.g., pinned, etc.) to the turntable 14 at a joint, shown as lower boom pivot 56. The boom 40 includes a first actuator (e.g., pneumatic cylinder, electric actuator, hydraulic cylinder, etc.), shown as lower lift cylinder 60 (see, e.g., FIG. 14). The lower lift cylinder 60 has a first end coupled to the turntable 14 and an opposing second end coupled to the lower boom 50. According to an exemplary embodiment, the lower lift cylinder 60 is positioned to raise and lower the boom 40 relative to the turntable 14 about the lower boom pivot 56.

As shown in FIG. 1, the boom 40 includes an implement, shown as platform assembly 92, coupled to the implement end of the jib 70. As shown in FIG. 1, the boom 40 includes a second actuator (e.g., pneumatic cylinder, electric actuator, hydraulic cylinder, etc.), shown as jib cylinder 80. According to an exemplary embodiment, the jib cylinder 80 is positioned to actuate (e.g., lift, rotate, elevate, etc.) the jib 70 and the platform assembly 92 relative to the boom 40 about the pivot 76. In some embodiments, the platform assembly 92 may be removed and/or replaced with an implement or a robotic assembly.

According to an exemplary embodiment, the platform assembly 92 is a structure that is particularly configured to support one or more workers. In some embodiments, the platform assembly 92 includes an accessory or tool that may be accessed by a worker. Such tools may include pneumatic tools (e.g., impact wrench, airbrush, nail gun, ratchet, etc.), plasma cutters, welders, spotlights, etc. In some embodiments, the platform assembly 92 includes a control panel to control operation of the lift device 10 (e.g., the turntable 14, the boom 40, etc.) from the platform assembly 92. In other embodiments, the platform assembly 92 includes or is replaced with an accessory and/or tool (e.g., forklift forks, etc.).

According to an exemplary embodiment, the lift device 10 includes a prime mover 24 that is supported by the lift base 12. In some embodiments, the prime mover 24 may be arranged within the turntable 14. The prime mover 24 provides power to the various components of the lift device 10 (e.g., the lower lift cylinder 60, the upper lift cylinder 80, the tractive elements 16, 18, steering actuators/motors, etc.). In some embodiments, the prime mover 24 is in the form of an internal combustion engine. In some embodiments, the prime mover 24 is in the form of one or more electric motors powered by an energy storage system (e.g., a battery, a battery pack, a plurality of battery packs, etc.). In some embodiments, the electric motors may be powered by a fuel cell that, in some configurations, supplies power in conjunction with one or more battery packs that supply the peak power.

As shown in FIGS. 2-5, the lift base or chassis 12 of the lift device 10 includes a pendulum axle assembly 100 and a carrier arm, shown as swing arm 102 coupled between each of the tractive elements 16, 18 and the lift base 12. In other words, each of the tractive elements 16, 18 is coupled to the lift base 12 by a swing arm 102 and a pendulum axle assembly 100. In some embodiments, the swing arms 102 define a portion of the lift base or chassis 12. In some embodiments, the lift device 10 includes four swing arms 102 (e.g., front-right, front-left, back-right, back-left). In some embodiments, the lift device 10 includes more or less than four swing arms 102. In general, each of the pendulum axle assemblies 100 and each of the swing arms 102 are similar in design and function, with like features identified using the same reference numerals. As such, the description herein with respect to one of the pendulum axle assemblies 100 and one of the swing arms 102 applies to all of pendulum axle assemblies 100 and all of the swing arms 102, respectively.

Figure 15:
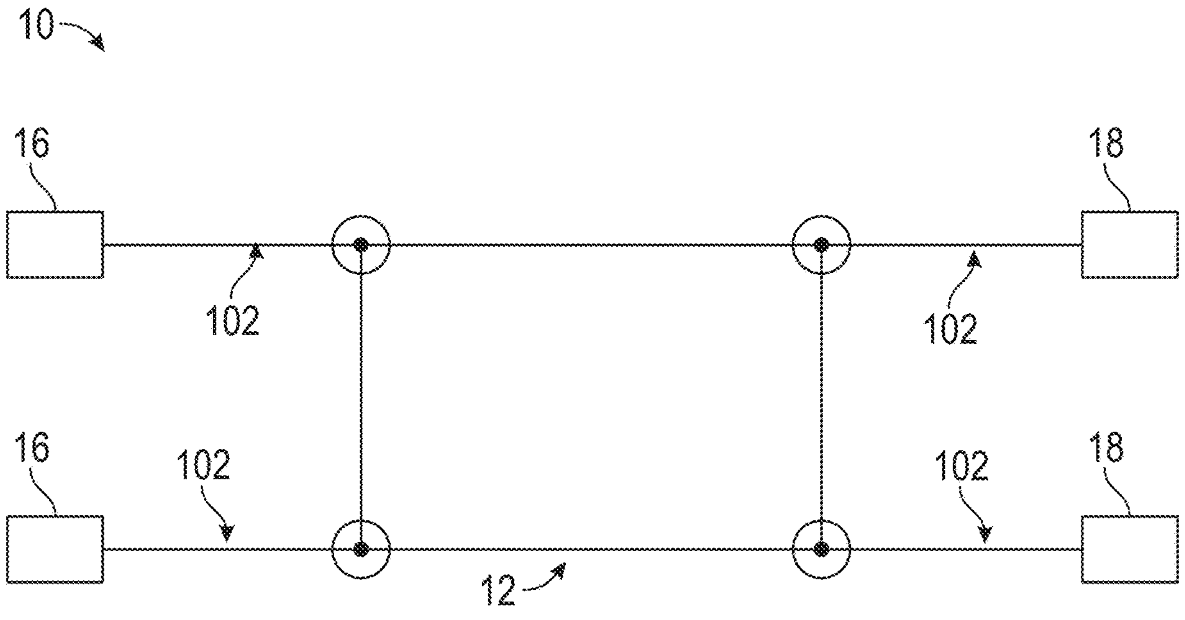
FIG. 15 is a schematic illustration of a lift device having a pendulum axle assembly and carrier arms in a retracted position, according to an exemplary embodiment.
Figure 16:
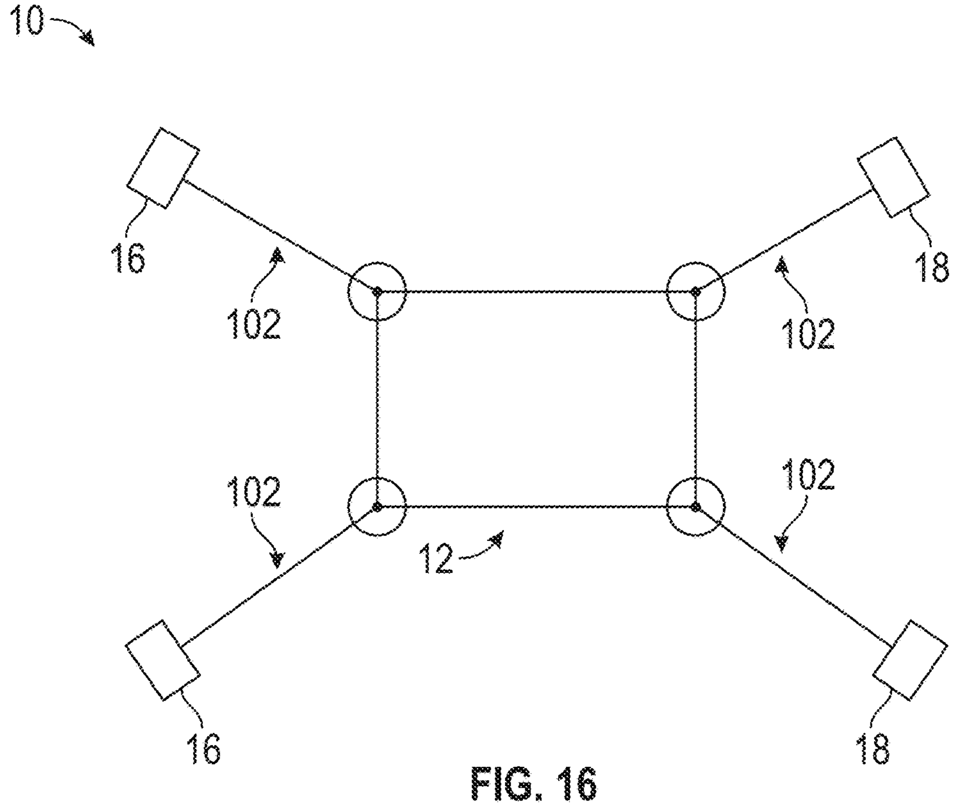
FIG. 16 is a schematic illustration of a lift device having a pendulum axle assembly and carrier arms moved to an extended position by the wheels, according to an exemplary embodiment.

In some embodiments, a first or proximal end of each of the swing arms 102 is pivotally coupled to the lift base 12 (e.g., X-frame) so that the swing arms 102 are configured to pivot relative to the lift base 12. In some embodiments, the first end of each of the swing arms 102 is pivotally coupled to the lift base 12 by a pin, rod, and/or bearing. The swing arms 102 may pivot between a retracted position (see, e.g., FIGS. 2, 3, and 15) and an extended position (see, e.g., FIGS. 7-10 and 16). In general, the swing arms 102 may be pivotally moved between any position between the retracted position and the extended position. In some embodiments, the steering arrangement defined by the pendulum axle assemblies 100 enables the swing arms 102 to be steered by the tractive elements 16, 18 between the retracted position and the extended positions, rather than a dedicated actuator or motor. Alternatively or additionally, a swing arm actuator may be coupled between each of the swing arms 102 and the lift base 12 to facilitate or assist in pivoting the swing arms between the retracted position and the extended position.

A second or distal end of each of the swing arms 102 is rotatably coupled to one of the tractive elements 16, 18 through a respective one of the pendulum axle assemblies 100. In some embodiments, the second end of each of the swing arms 102 includes an angled portion or wall 104 and a coupling mechanism or weldment 106 that extends from a distal end of the angled portion 104. The angled portion 104 forms at least part of a wheel well for the tractive element 16, 18 coupled to the pendulum axle assembly 100. The coupling mechanism 106 is rotatably coupled to the pendulum axle assembly 100 so that the pendulum axle assembly 100 is allow to rotate relative to the coupling mechanism 106 and the swing arm 102. In this way, for example, each of the tractive elements 16, 18 may be independently steered, for example, by a steering motor or actuator. In some embodiments, a pin, a rod, and/or a bearing extends through the coupling mechanism 106 to rotatably couple the swing arm 102 to the pendulum axle assembly 100. In some embodiments, a bearing is sandwiched between the coupling mechanism 106 and the pendulum axle assembly 100.

Each of the pendulum axle assemblies 100 includes a pendulum linkage assembly 108, a pendulum cylinder or actuator 110, and a pendulum housing 112. The pendulum linkage assembly 108 includes a pendulum plate 114, an angled linkage 116, and a pivoting linkage 118. The pendulum plate 114 is rotatably coupled to the coupling mechanism 106 of the swing arm 102 (e.g., via a pin, a rod, and/or a bearing). The angled linkage 116 extends away from the pendulum plate 114 (e.g., at an acute angle relative to a longitudinal axis defined by the pendulum cylinder 110) and is coupled between the pendulum plate 114 and the pivoting linkage 118. The pendulum plate 114 and the angled linkage 116 form at least a part of a wheel well for the tractive element 16, 18 coupled to the pendulum axle assembly 100. For example, the angled portion 104 and the coupling mechanism 106 of the swing arm 102 and the pendulum plate 114 and the angled linkage 116 of the pendulum axle assembly 100 may combined to form a wheel well for the tractive element 16, 18.

The pivoting linkage 118 is pivotally coupled to an end of the angled linkage 116 that is opposite to the end coupled to the pendulum plate 114. The pivoting linkage 118 is coupled between the angled linkage 116 and the tractive element 16, 18. In some embodiments, the pivoting linkage 118 is coupled to the angled linkage 116 by a pin, a rod, and/or a bearing. In general, the pivoting linkage 118 is configured to pivot about a pivot point 120 so that the tractive element 16, 18 is allowed to move (e.g., substantially vertically or in a direction perpendicular to a ground on which the tractive element 16, 18 travels) relative to the swing arm 102. In some embodiments, the pivoting linkage 118 allows the tractive element 16, 18 to displace along a vertical direction 122. In this way, for example, the pendulum axle assembly 100 is configured to allow the tractive element 16, 18 to move along the vertical direction 122 as the lift device 10 travels over uneven ground. Additionally, the pendulum axle assembly 100 may assist in a leveling operation where the operating height of the swing arms 102 are adjusted with respect to one another so that the lift base 12 is leveled. In some embodiments, the pivoting linkages 118 on the pendulum axle assemblies 100 may move between a stowed position (see, e.g., FIG. 2) and an elevated position (see, e.g., FIG. 1). A distance between the tractive element 16, 18 and the swing arm 102 (e.g., measured along the vertical direction 122) in the stowed position is smaller than a distance between the tractive element 16, 18 and the swing arm 102 (e.g., measured along the vertical direction 122) in the elevated position. In general, the pendulum axle assemblies 100 allow the tractive elements 16, 18 to displace along the vertical direction 122 to any position between the stowed position and the elevated position.

The pendulum cylinder 110 is coupled between the linkages of the pendulum linkage assembly 108. Specifically, the pendulum cylinder 110 is coupled between the pendulum plate 114 and the pivoting linkage 118. In some embodiments, the pendulum cylinder 110 includes a piston-cylinder arrangement that is configured to provide a force on the pivoting linkage 118 that urges the tractive element 16, 18 to maintain contact with the ground (e.g., a downward along the vertical direction 122 from the perspective of FIG. 3). In some embodiments, the pendulum cylinder 110 is configured as a damper (e.g., a hydraulic damping cylinder or a pneumatic damping cylinder) that reduces the vibration transferred to the swing arm 102 when the tractive element 16, 18 moves along the vertical direction 122. In some embodiments, the pendulum cylinder 110 is configured to actively adjust an operating height (e.g., during a leveling procedure) of the swing arm 102.

Figure 3:
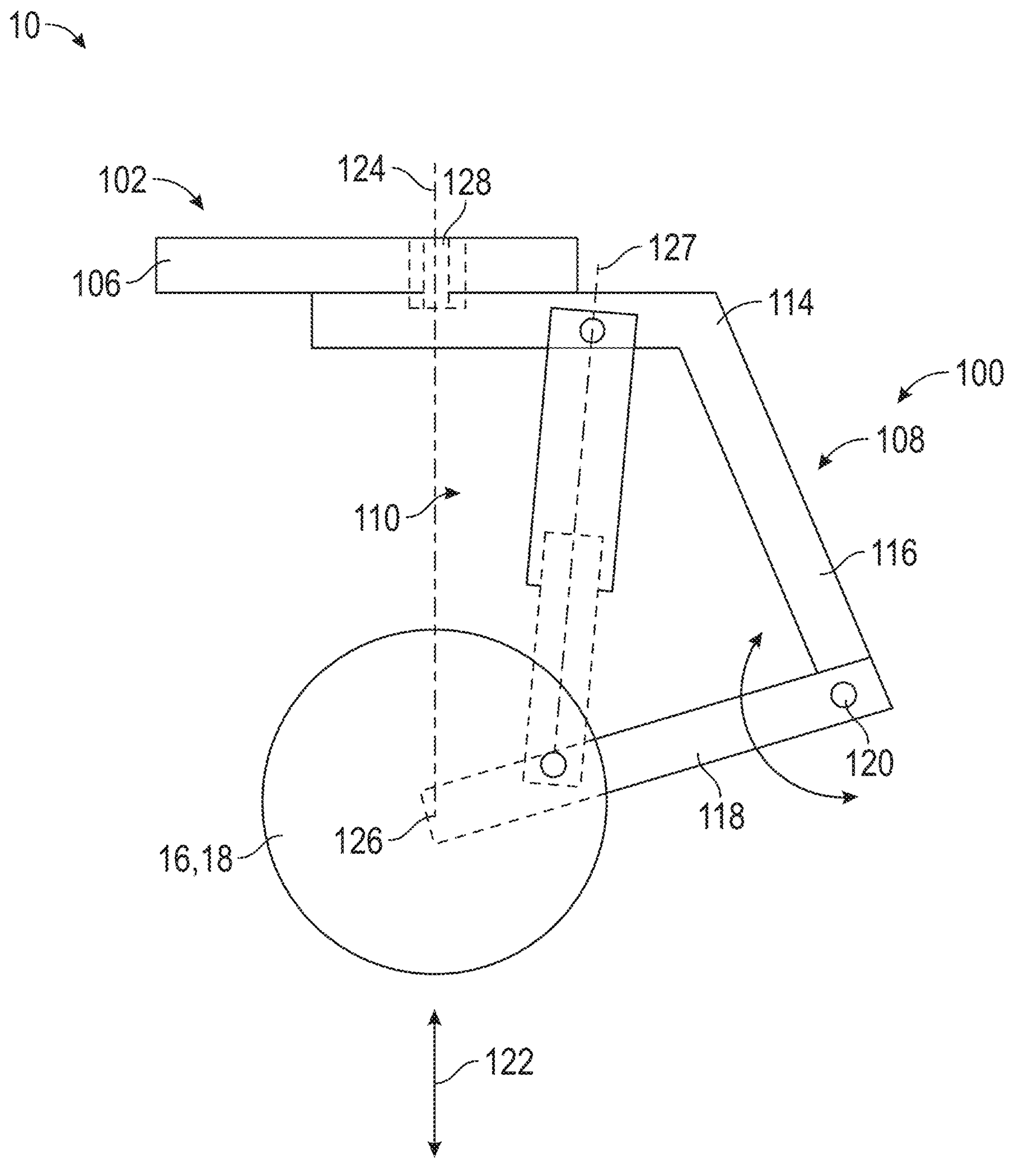
FIG. 3 is a schematic illustration of a pendulum axle assembly of the lift device of FIG. 1, according to an exemplary embodiment.
Figure 4A:
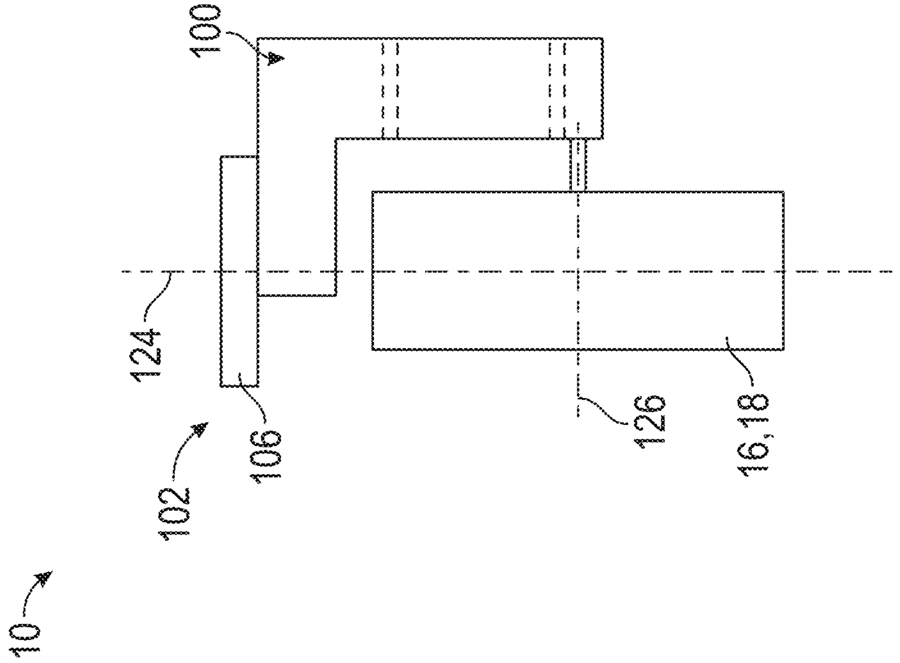
FIG. 4A is a schematic illustration of a pendulum axle assembly coupled to a single wheel, according to an exemplary embodiment.
Figure 4B:
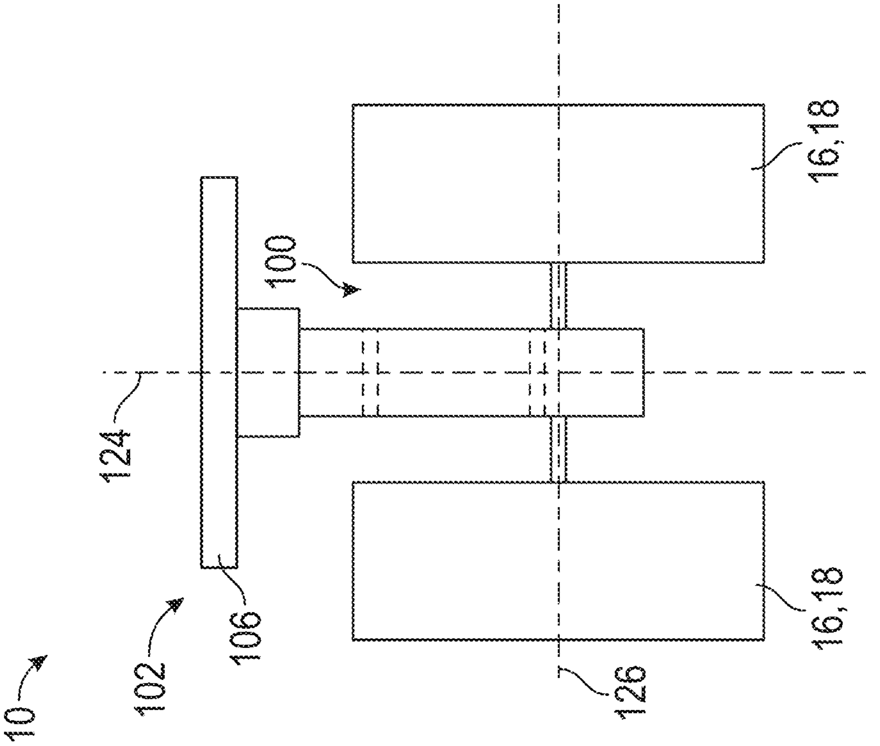
FIG. 4B is a schematic illustration of a pendulum axle assembly coupled to a dual wheel, according to an exemplary embodiment.

With reference to FIGS. 3-4B, the pendulum axle assembly 100 defines a steering axis 124 along which the tractive element 16, 18 rotates to steer the lift device 10. The rotatable coupling between the pendulum axle assembly 100 and the swing arm 102 is formed along the steering axis 124, and the steering axis 124 is centered over the tractive element 16, 18. For example, the steering axis 124 intersects a rotational axis 126 defined by the tractive element 16, 18 for both a single wheel configuration (FIG. 4A) and a dual-wheel configuration or assembly (FIG. 4B). In this way, for example, the pendulum axle assemblies 100 define a steering geometry with zero rolling radius because the steering axis 124 remains vertical and centered above the tractive elements 16, 18 during operation. Additionally, each of the tractive elements 16, 18 may be independently steered by a steering motor or actuator 128 that is coupled between the swing arm 102 and the pendulum axle assembly 100. In general, the steering motor or actuator 128 is configured to rotate the pendulum axle assembly 100 and the tractive element 16, 18 coupled thereto relative to the swing arm 102 to change a travel direction of the tractive element 16, 18. As will be described herein, the steering geometry provided by the pendulum axle assemblies 100 allows the steering motors 128 to rotate the tractive elements 16, 18 relative to the swing arms 102 at extreme angles (e.g., to where the tractive elements 16, 18) are arranged substantially perpendicularly to the swing arms 102), which is beneficial to the overall stability of the lift device 10.

In the illustrated embodiment, the pendulum cylinder 110 extends along a cylinder axis 127 that is offset from the steering axis 124 (e.g., arranged at an angle relative to the steering axis 124) In some embodiments, the cylinder axis 127 is arranged at a nonzero acute angle relative to the steering axis 124 (e.g., from the perspective of FIG. 3), and/or is not parallel to the steering axis 124.

Figure 5:
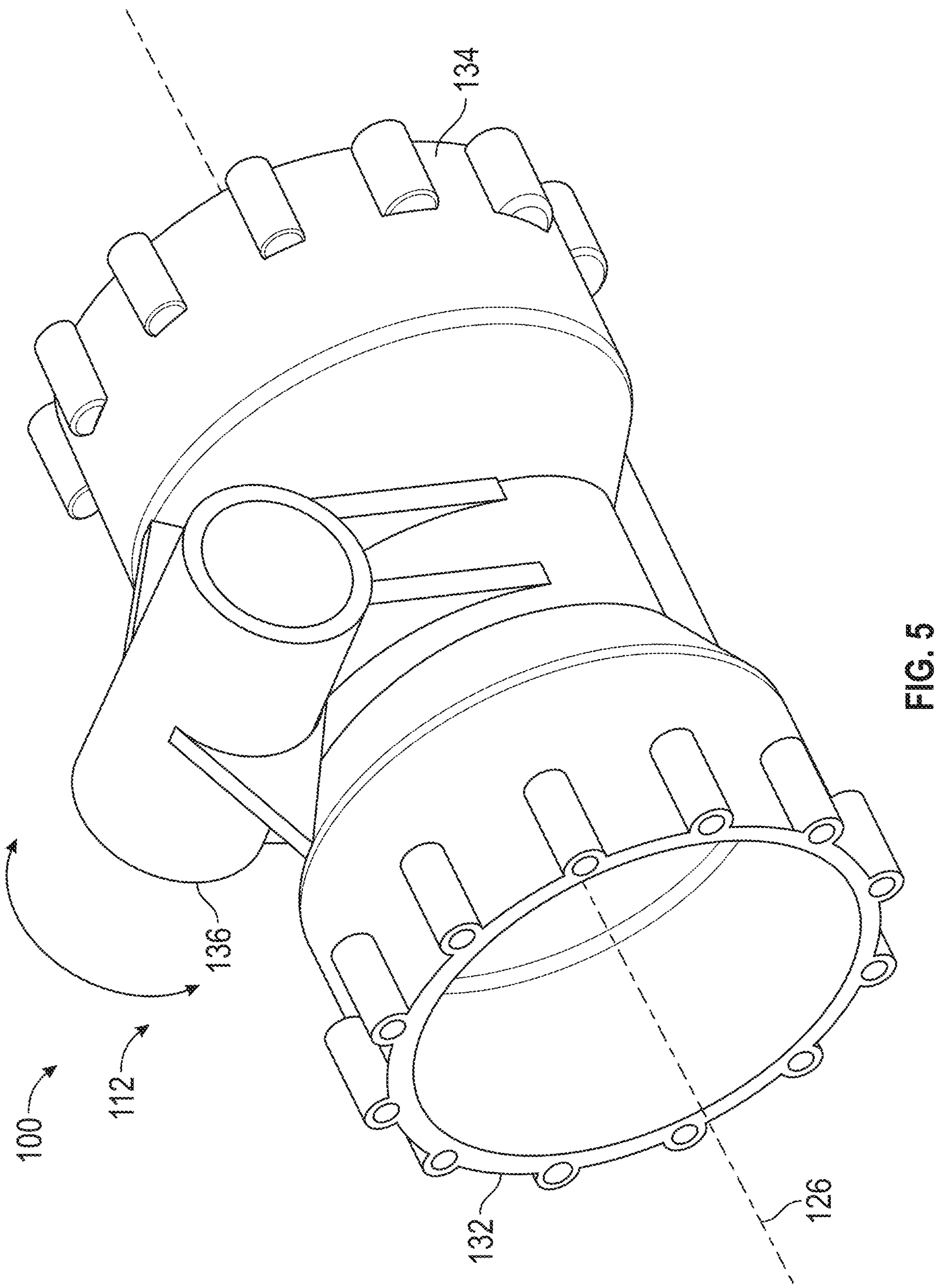
FIG. 5 is a perspective view of a pendulum housing of the pendulum axle assembly of the lift device of FIG. 1, according to an exemplary embodiment.

With specific reference to FIG. 5, each of the pendulum axle assemblies 100 may include a pendulum housing 112 that is coupled to the tractive element 16, 18. In some embodiments, each of the tractive elements 16, 18 may include a pair of laterally spaced wheels. In some embodiments, each of the tractive elements may include a single wheel. In the illustrated embodiment, the pendulum housing 112 is design to couple to a pair of wheels and includes a first wheel hub 132 and a second wheel hub 134 that is spaced from the first wheel hub 132 along the rotational axis 126. A cylindrical hub 136 is attached to the pendulum housing 112 and is arranged between the first wheel hub 132 and the second wheel hub 134. In some embodiments, the cylindrical hub 136 provides a pivotal coupling for the pendulum cylinder 110 to attach to and enables the pendulum housing 112 to pivot so that the rotational axis 126 pivots relative to the cylindrical hub 136. In this way, for example, the tractive elements 16, 18 coupled to the pendulum housing 112 are able to pivot relative to one another about the cylindrical hub 136.

Figure 6:
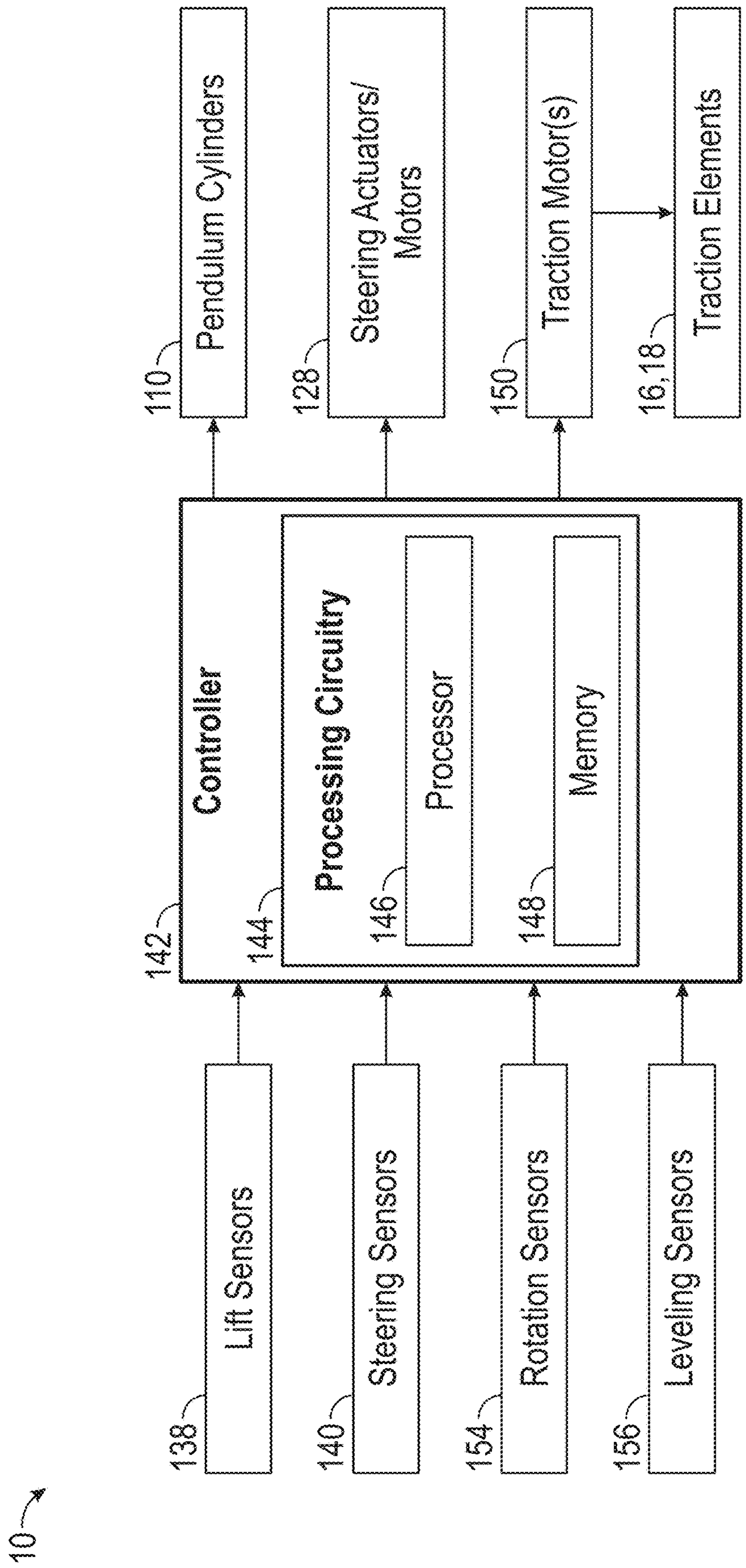
FIG. 6 is a block diagram of a controller of the life device of FIG. 2, according to an exemplary embodiment.
Figure 7:
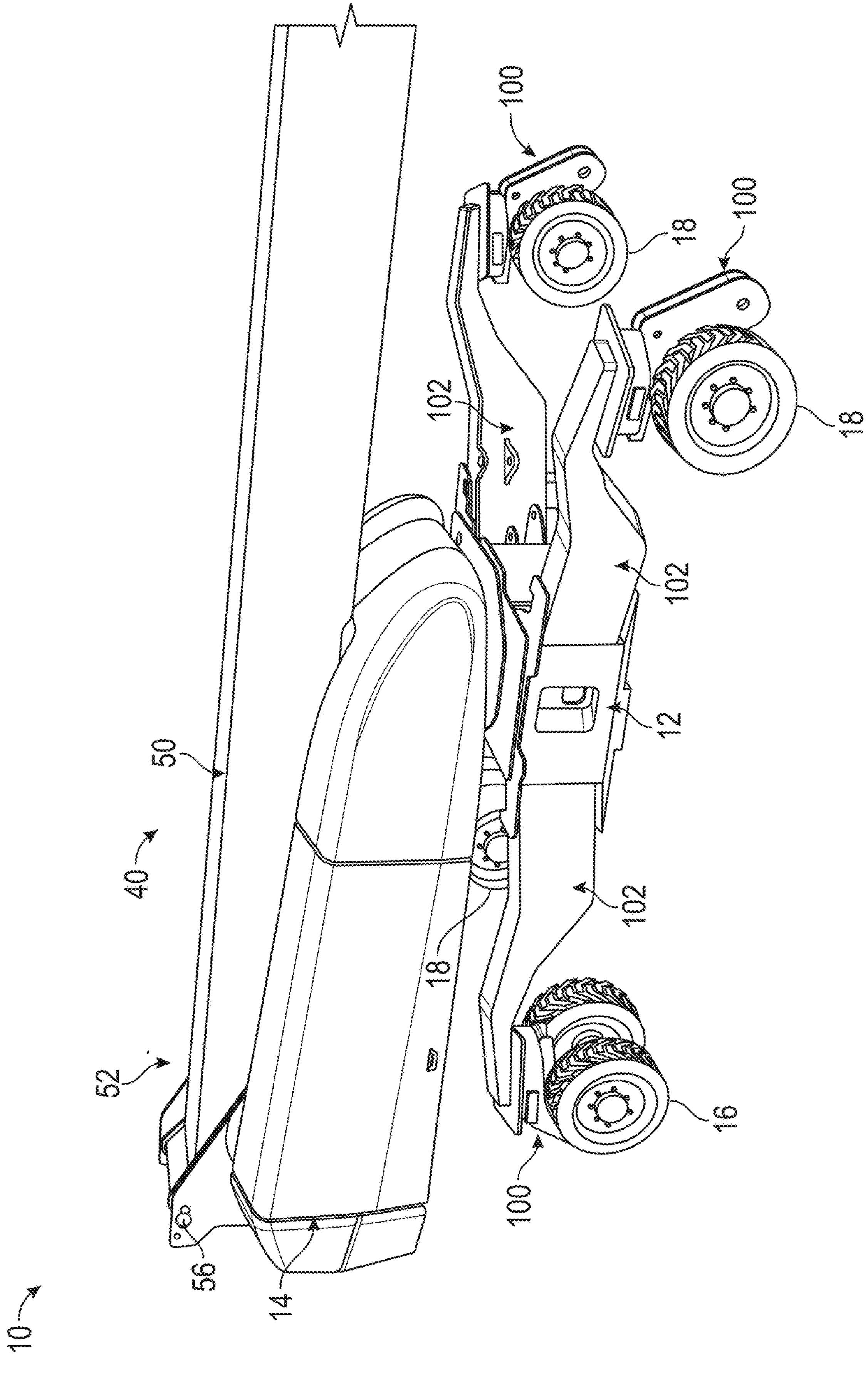
FIGS. 7-10 show the lift device of FIG. 2 in various operating conditions, according to an exemplary embodiment.

Turning to FIG. 6, in some embodiments, the pendulum axle assemblies 100 may each include a lift sensor 138 and a steering sensor 140. In some embodiments, the lift sensor 138 may be a hall effect sensor, an optical sensor, a laser sensor, a displacement transducer, etc. Each of the lift sensors 138 is configured to detect a position of the pendulum cylinder 110 (e.g., a position of a piston of the pendulum cylinder 110 relative to a cylinder of the pendulum cylinder 110) or another lift actuator that is dedicated to leveling the swing arms 102. In some embodiments, the steering sensors 140 may be a rotary encoder that are configured to detect a rotary position of the pendulum axle assemblies 100, and thereby the tractive elements 16, 18, relative to the swing arms 102. In some embodiments, the lift device 10 may include one or more rotational sensors 154 that are configured to measure a steering angle defined by the swing arms 102 and/or the tractive elements 16, 18. In some embodiments, the lift device 10 may include one or more leveling sensors 156 that measure a position of one or more portions of the lift base 12 and/or the swing arms 102 to assist with leveling the lift base 12 and/or the swing arms 102.

The lift sensors 138 and the steering sensors 140 are both in communication with a controller 142 of the lift device 10. The controller 142 includes a processing circuit 144 having a processor 146 and memory 148. The processing circuit 144 can be communicably connected to a communications interface such that the processing circuit 144 and the various components thereof can send and receive data via the communications interface. The processor 146 can be implemented as a general-purpose processor, an application specific integrated circuit ("ASIC"), one or more field programmable gate arrays ("FPGAs"), a group of processing components, or other suitable electronic processing components.

The memory 148 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 148 can be or include volatile memory or non-volatile memory. The memory 148 can include database components, object code components, script components, or any other type of information structure for supporting the various activities and information structures described in the present application. According to some embodiments, the memory 148 is communicably connected to the processor 146 via the processing circuit 144 and includes computer code for executing (e.g., by the processing circuit 144 and/or the processor 146) one or more processes described herein.

In some embodiments, the controller 142 is in communication with the pendulum cylinders 110, the steering actuators or motors 128, and one or more traction motors 150. In some embodiments, each of the traction elements 16, 18, or pair of traction elements 16, 18 includes a dedicated traction motor 150 (e.g., one traction motor 150 for each of the swing arms 102). In some embodiments, the traction motor 150 may be a hydraulic motor or an electric motor.

Figure 17:
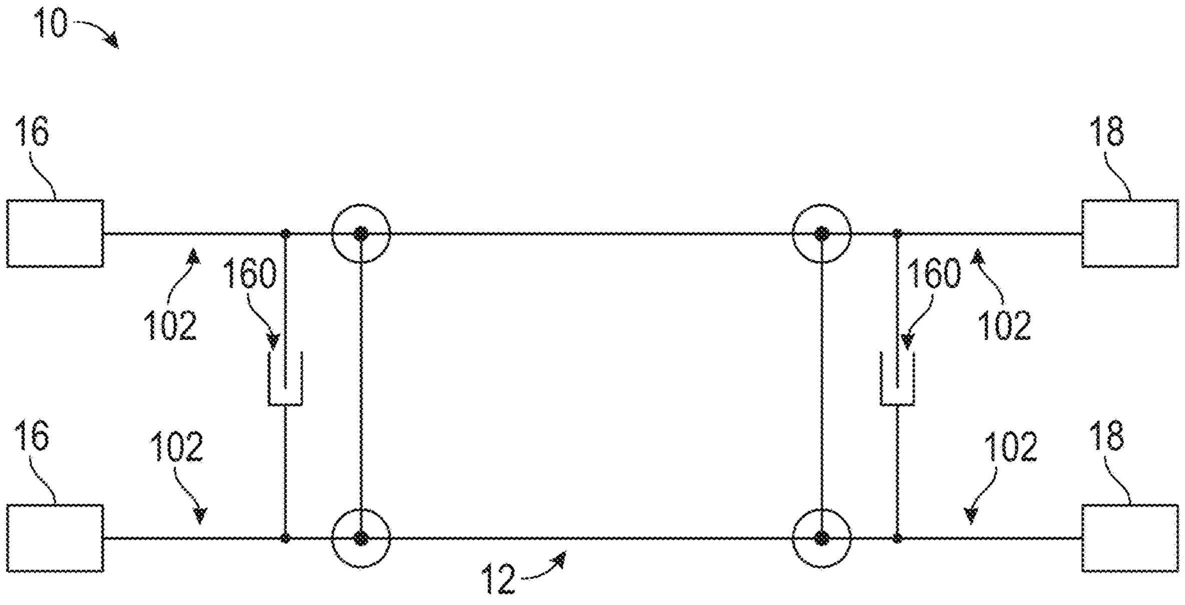
FIG. 17 is a schematic illustration of a lift device having a pendulum axle assembly and carrier arms that are selectively locked by a locking cylinder or linear locking device, according to an exemplary embodiment.
Figure 18:
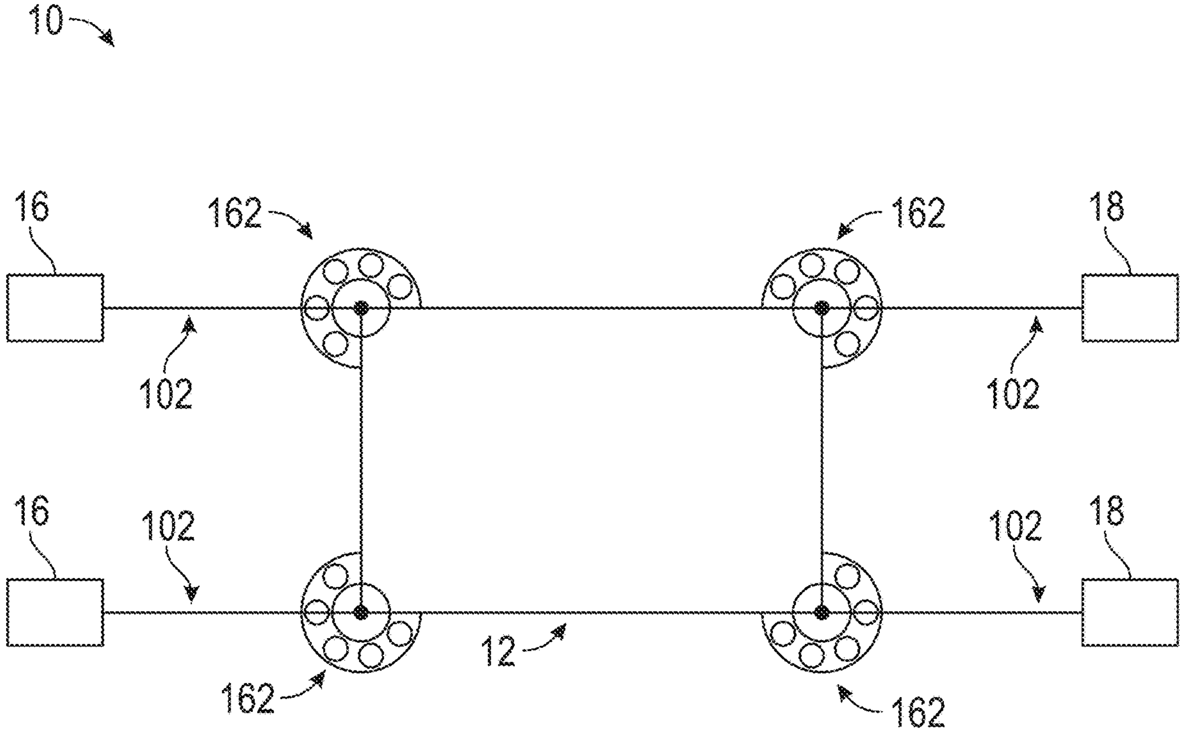
FIG. 18 is a schematic illustration of a lift device having a pendulum axle assembly and carrier arms that are selectively locked by a radial lock, according to an exemplary embodiment.

Conventional lift devices typically include a dedicated actuator that deploy the carrier arms 102 from the retracted position to the extended position. The design and properties of the lift device 10 including the pendulum axle assemblies 100 removes the need for a dedicated component to deploy the carrier arms 102, and allows the carrier arms 102 to be deployed using the existing components for steering and driving the tractive elements 16, 18 without using hydraulic cylinders. For example, the steering motors 128 and the traction motors 150 may be individually controlled (e.g., by the controller 142) so that the tractive elements 16, 18 to move the swing arms 102 between the retracted position and the extended position. For example, the traction motor(s) 150 and the steering motors 128 may cooperate to move the swing arms 102 between the retracted position and the extended position. That is, the independent steering of the traction elements 16, 18 and the steering geometry provided by the pendulum axle assemblies 100 may be leveraged to provide improved steering use the traction motor(s) 150 and the steering motors 128 to move the swing arms 102 between the retracted position (see, e.g., FIGS. 1, 2, and 15) and an extended position (see, e.g., FIGS. 7-10 and 16). In some embodiments, the conventional hydraulic cylinders that are used to extend/retract the swings arms are replaced with a locking mechanism that is configured to lock the swing arms in a predefined position (e.g., in the retracted position, the extended position, and/or any position between the retracted position and the extended position). In some embodiments, a locking mechanism is coupled between respective pairs of the swing arms 102 (e.g., between the front swing arms and between the rear swing arms). In some embodiments, a locking mechanism is coupled between each of the swing arms 102 and the lift base 12. In some embodiments, the locking mechanism is in the form of a linear locking device 160 (e.g., a locking cylinder) that locks the swing arms 102 in position based on friction or mechanical engagement (see, e.g., FIG. 17). For example, the linear locking device may include a mechanized pin (e.g., controlled by the controller 142) that selectively actuates (e.g., and extend through a locking aperture) to lock the swing arms 102 in a predefined position (e.g., in the retracted position, the extended position, and/or any position between the retracted position and the extended position). In some embodiments, the locking mechanism is in the form of a radial locking device 162 that includes a disk or plate having a plurality of spaced apertures and a mechanized pin (see, e.g., FIG. 18). The mechanized pin may be controlled by the controller 142 and/or remotely controlled, so that the mechanized pin selectively actuates into one of the apertures to lock the swing arms 102 relative to the lift base 12 in a predefined position (e.g., in the retracted position, the extended position, and/or any position between the retracted position and the extended position).

In some embodiments, the independent steering provided by the pendulum axle assemblies 100 may enable pairs of the tractive elements 16, 18 (e.g., the front tractive elements 16 together and the rear tractive elements 18 together) to be steered in the same direction and enable vector steering. For example, the front tractive elements 16 may match the steering angle of the rear tractive elements 18, or vice versa, to enable the lift device 10 to travel using vector steering.

Figure 8:
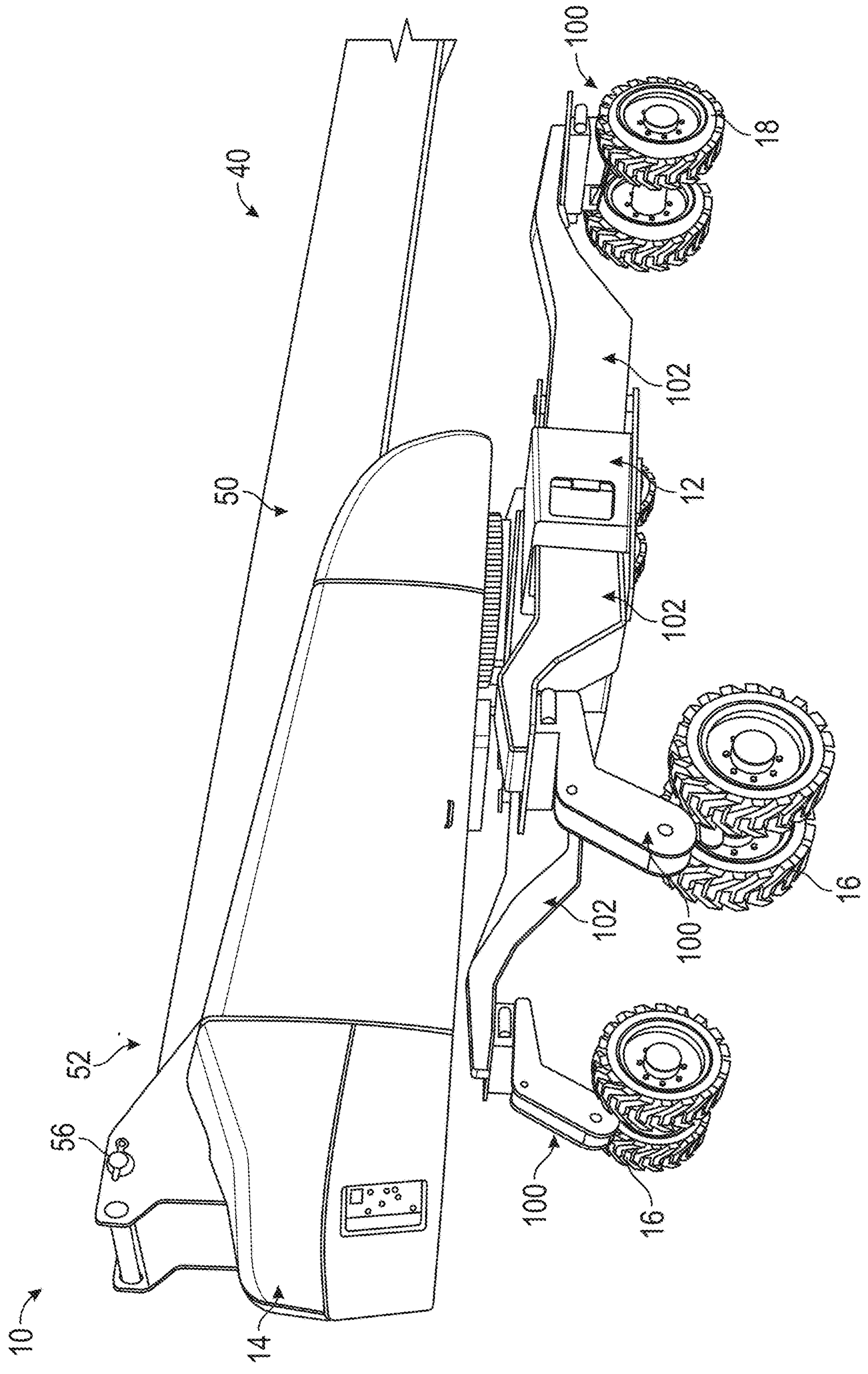

FIGS. 7-10 illustrate the pendulum axle assemblies 100 of the lift device 10 varying an height of the swing arms 102 relative to the tractive elements 16, 18. For example, FIG. 8 illustrates an exemplary embodiment where a distance between the front tractive elements 16 and the respective swing arms 102 coupled thereto (e.g., measured along the vertical direction) is less than a distance between the rear tractive elements 18 and the respective swing arms 102 coupled thereto. In some embodiments, the lift device 10 may operate along terrain where the rear tractive elements 18 displace closer to the swing arms 102 than the front tractive elements 16.

Figure 9:
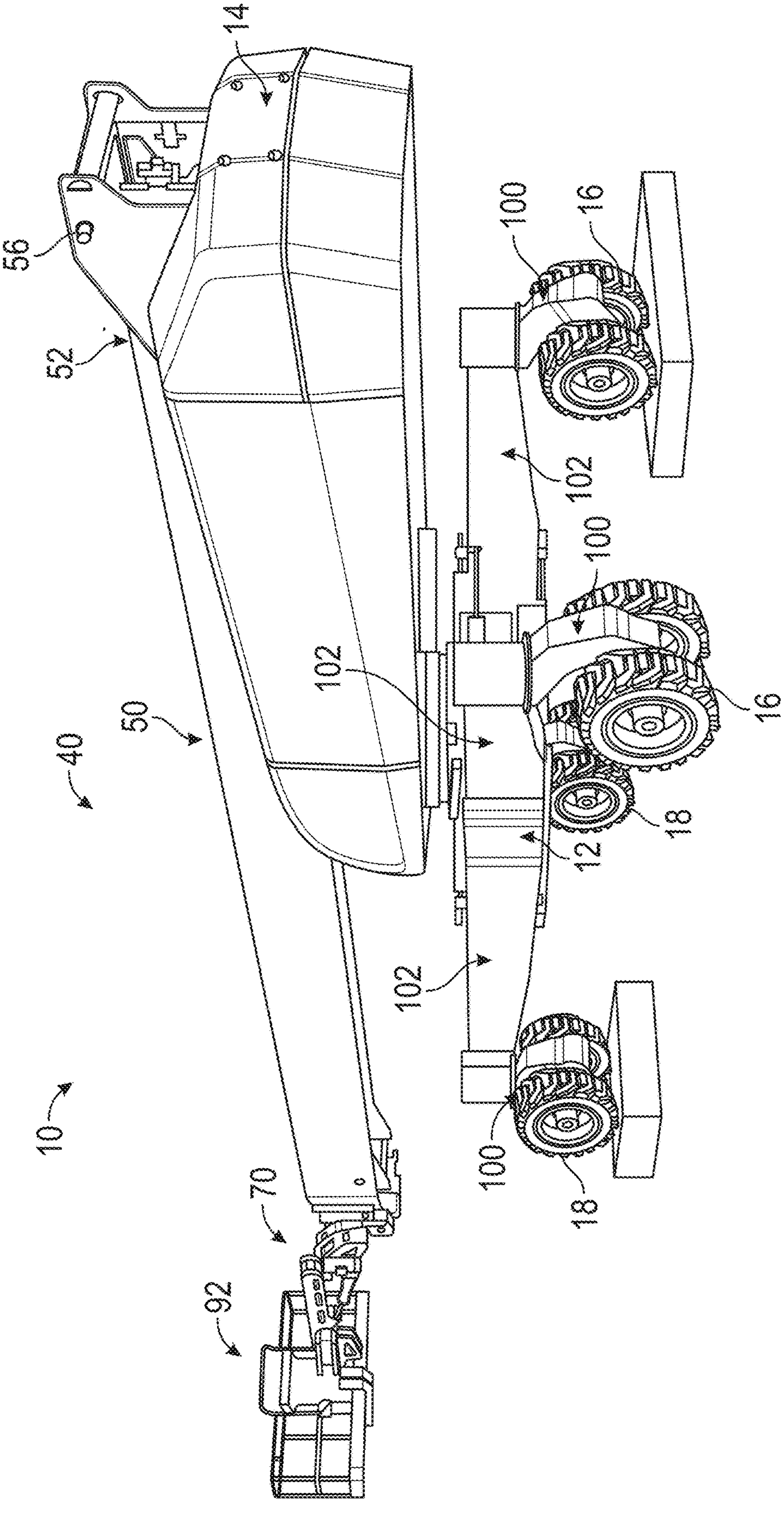

FIG. 9 illustrates an exemplary embodiment where the front tractive elements 16 are arranged at different heights relative to the swing arms 102 coupled thereto (e.g., along the vertical direction 122), and the rear tractive elements 18 are arranged at different heights relative to the swing arms 102 coupled thereto (e.g., along the vertical direction 122). For example, the tractive elements 16, 18 defined along front-left corner and the back-right corner of the lift base 12 may be arranged at a different height (e.g., along the vertical direction) than the tractive elements defined along the front-right corner and the back-left corner. In general, the incorporation of the pendulum axle assemblies 100 enables the tractive elements 16, 18 to accommodate these changes in ground height and maintain the leveling capabilities of the lift device 10.

Figure 10:
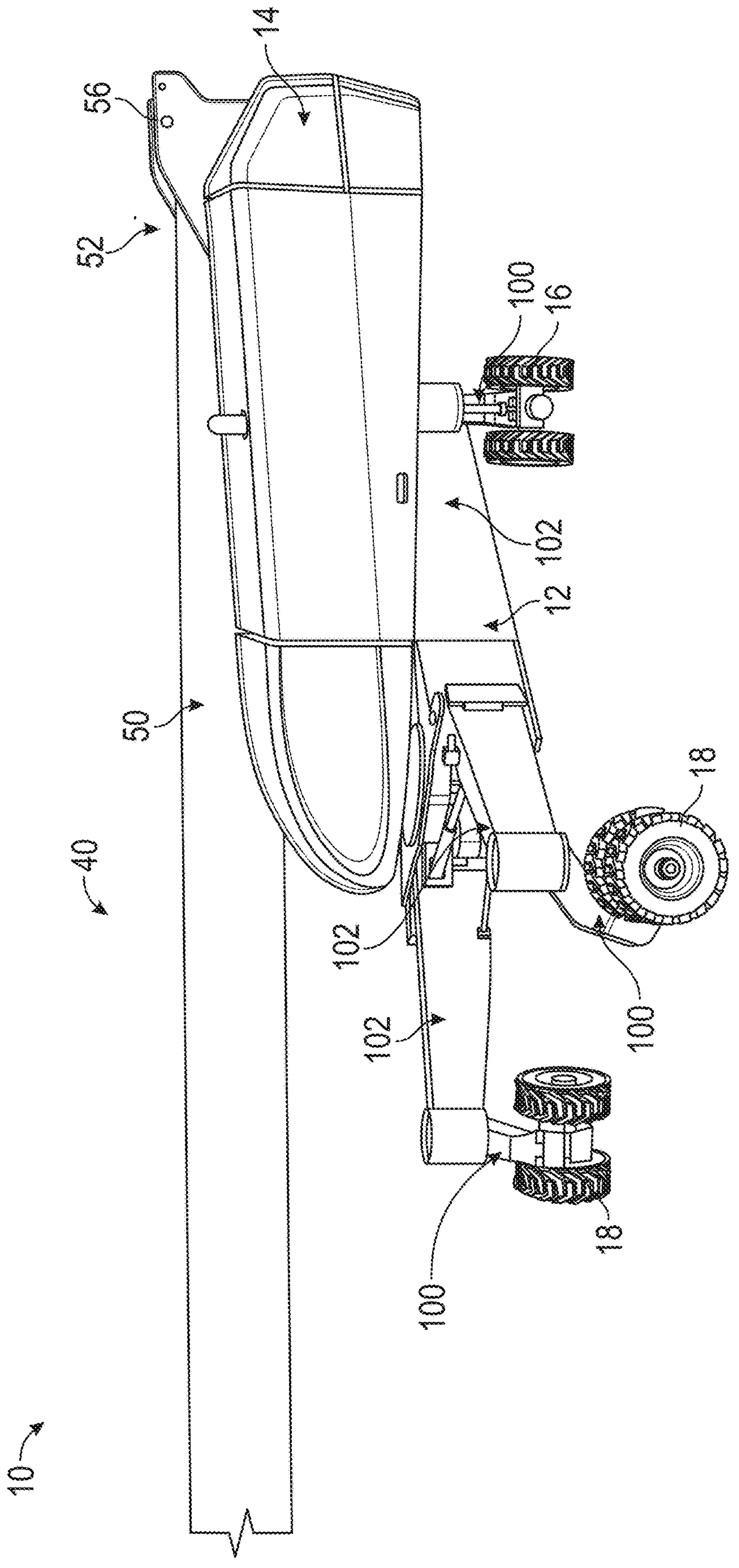

FIG. 10 illustrates an exemplary embodiment where the tractive elements 16, 18 are independent steered so that the front tractive elements 16 define different steering angles and the rear tractive elements 18 define different steering angles.

FIGS. 11-14 illustrate an embodiment of the lift device 10 where a turntable bearing 152 is arranged below a pivot plane P defined by the swing arms 102. The turntable bearing 152 is coupled between the turntable 14 and the lift base 12 and is configured to allow the turntable 14 to rotate relative to the lift base 12. In some embodiments, the pivot plane P is defined by a plane that includes the uppermost point on each of the swing arms 102. An entirety of the turntable bearing 152 is arranged below the pivot plane P, which improves the maneuverability and balance of the lift device 10.

Figure 11:
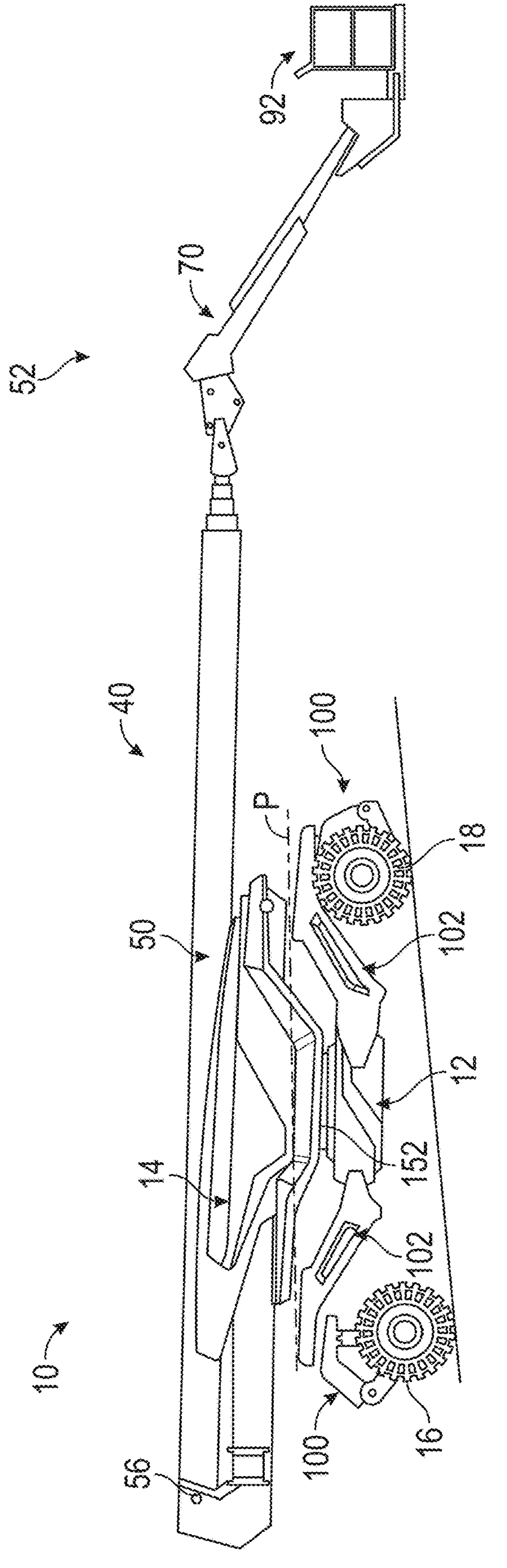
FIGS. 11-14 show various views of a lift device having a pendulum axle assembly and a lowered turntable bearing, according to an exemplary embodiment.
Figure 12:
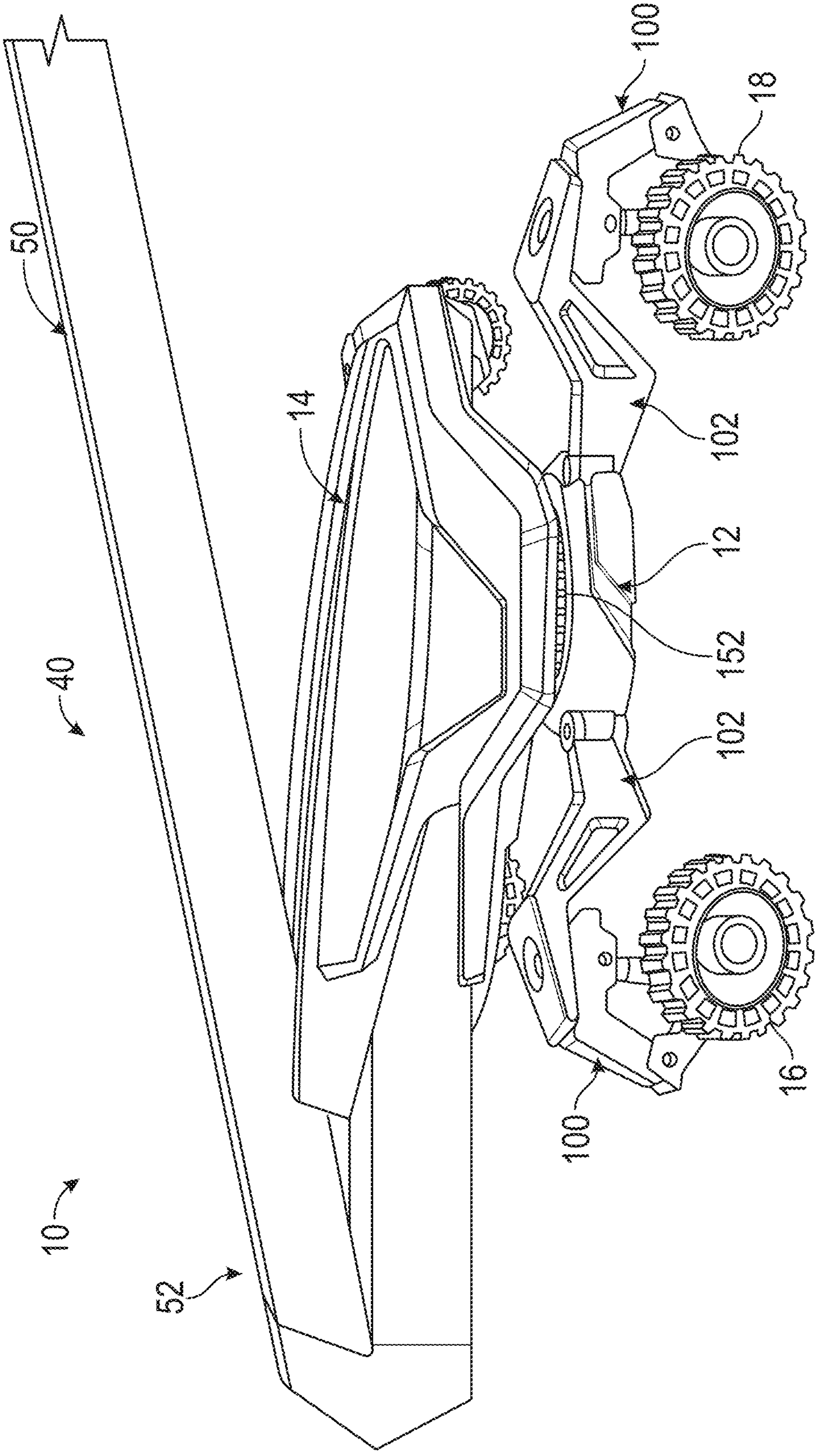
Figure 13:
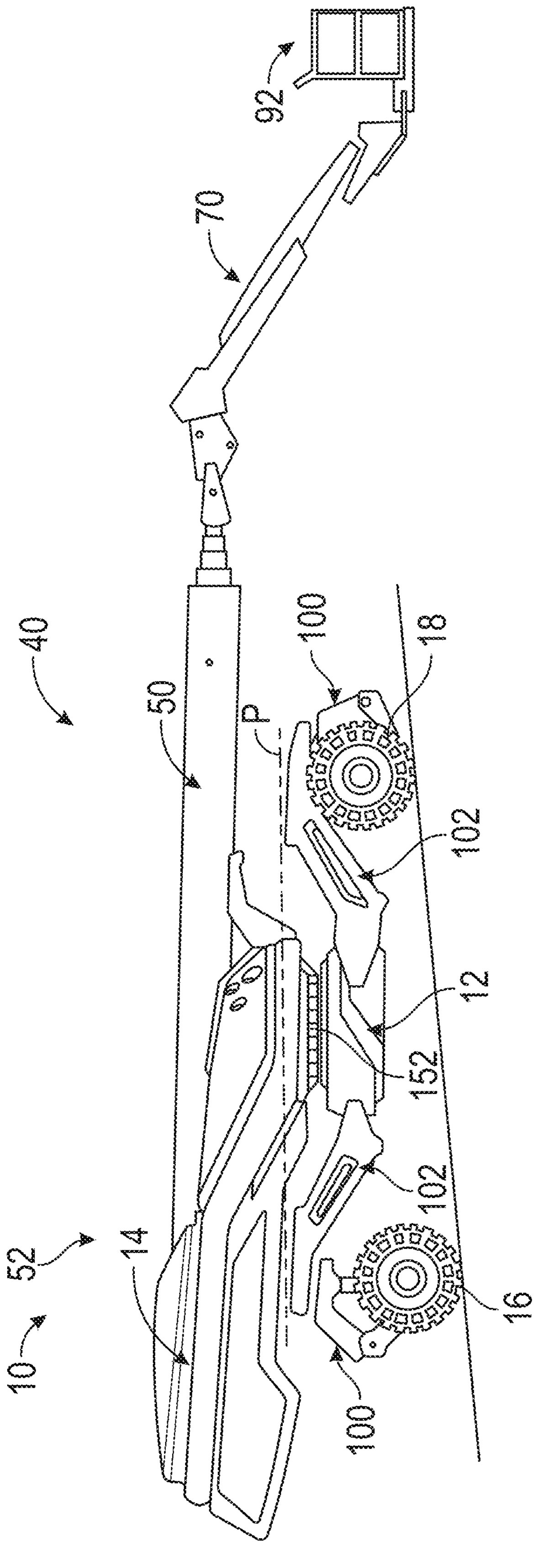

In the exemplary embodiment of FIGS. 11 and 12, the lower boom 50 extends rearward (e.g., toward the rear end 30) of the turntable 14 and the lower boom pivot 56 is arranged remotely the turntable 14 (e.g., the lower boom pivot 56 is not directly coupled to the turntable 14). In the exemplary embodiment of FIGS. 13 and 14, the turntable 14 includes a recess or niche 156 that receives the lower boom 50 and the lower boom pivot 56 is directly coupled to the turntable 14. The pendulum axle assemblies 100 may be installed on and leveraged by any exemplary embodiments of the lift device 10 shown or described herein.

Figure 19:
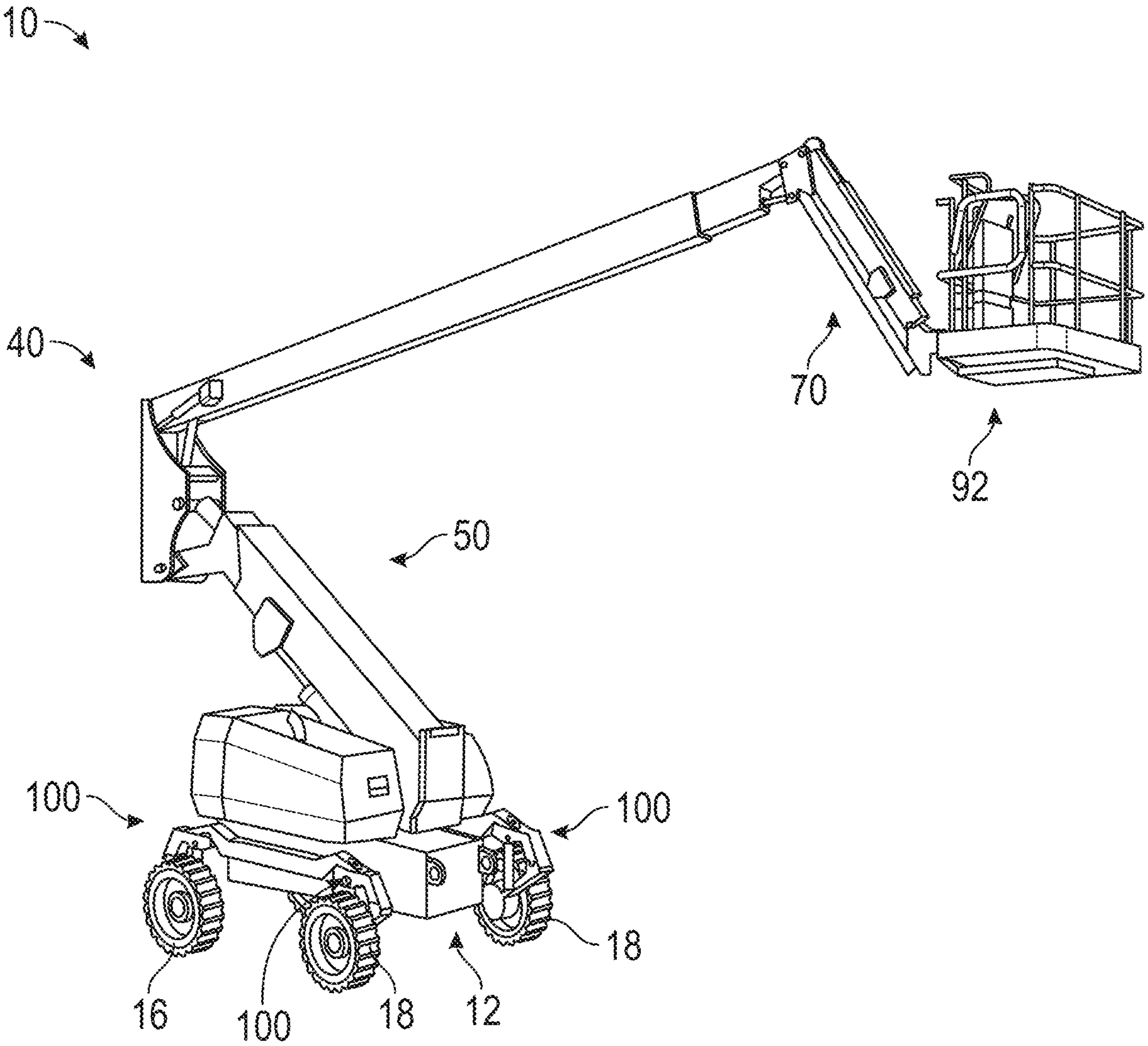
FIG. 19 is a perspective view of a lift device having a pendulum axle assembly and a fixed frame, according to an exemplary embodiment.
Figure 20:
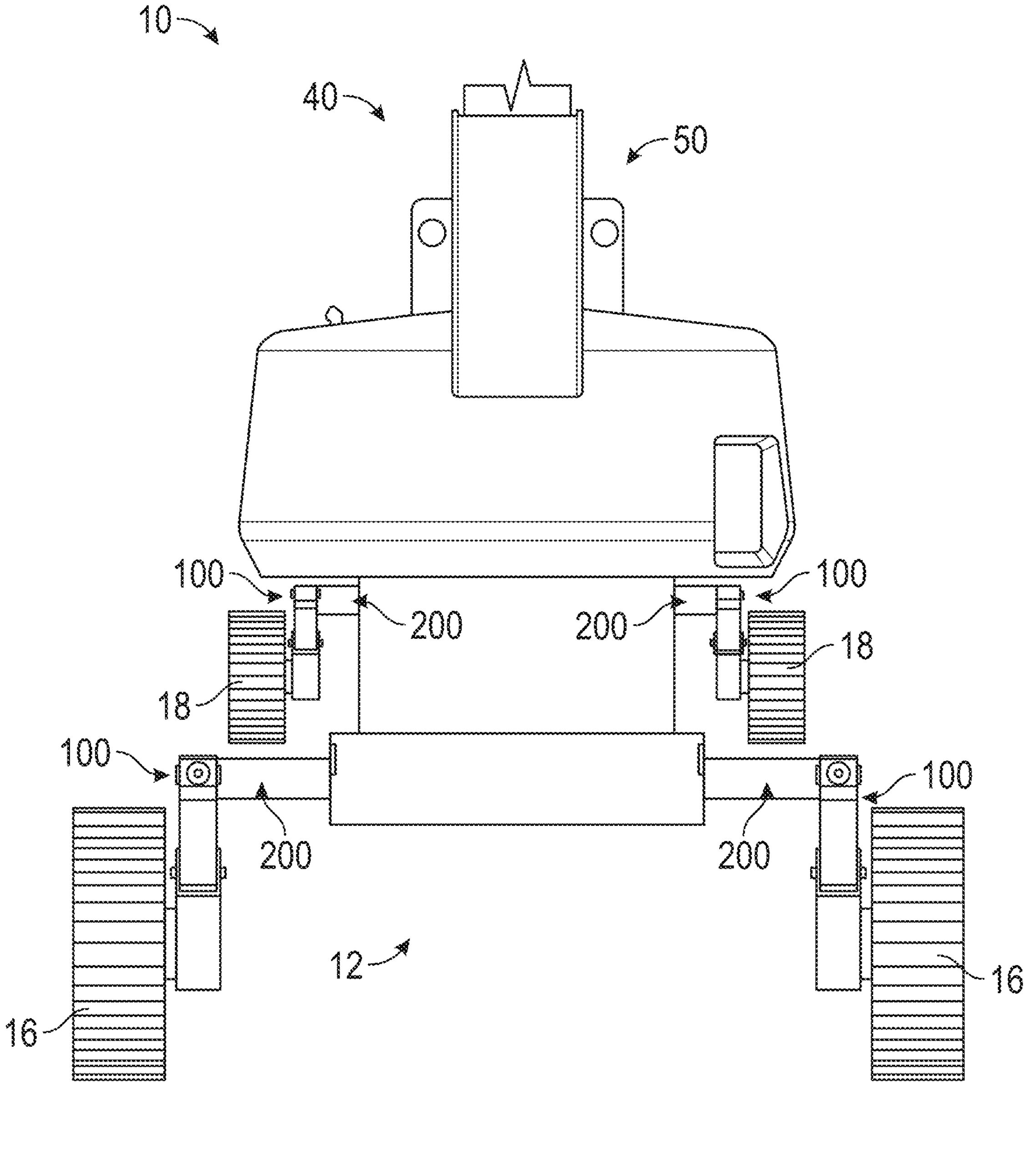
FIG. 20 is a schematic illustration of a lift device having a pendulum axle assembly and extending axles, according to an exemplary embodiment.

In some embodiments, the swing arms 102 of the lift device 10 may be fixed relative to the lift base 12, rather than pivotal, and the pendulum axle assemblies 100 may be implemented on the lift device 10 having a fixed frame/chassis (see, e.g., FIG. 19). In some embodiments, the pendulum axle assemblies 100 may be implemented on a lift device 10 having extending axles (see, e.g., FIG. 20). For example, the lift device 10 may include axles 200 that extend outwardly or laterally relative to the frame 12, and each of the axles 200 includes a pendulum axle assembly 100 arranged at a distal end thereof.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the lift device 10 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A lift device, comprising:
- a lift base;
- a turntable supported on and rotatably coupled to the lift base;
- a boom assembly coupled to the turntable;
- a platform coupled to the boom assembly so that the boom assembly is configured to selectively raise and lower the platform; and
- a plurality of tractive elements, each being coupled to the lift base by:
  - a carrier arm; and
  - a pendulum axle assembly, wherein each of the carrier arms is coupled to the lift base and rotatably coupled to a respective one of the pendulum axle assemblies, wherein each of the pendulum axle assemblies includes;
  - a pendulum linkage that is pivotally coupled between a respective one of the carrier arms and a respective one of the plurality of tractive elements;
  - a pendulum plate coupled to the respective one of the carrier arms; and
  - an angled arm coupled between the pendulum plate and the pendulum linkage;
  - wherein each of the pendulum axle assemblies defines a steering axis that intersects and is centered relative to the respective one of the plurality of tractive elements, and wherein each of the carrier arms is directly coupled to the respective one of the pendulum axle assemblies at the steering axis.

2. The lift device of claim 1, wherein the pendulum plates and the angled arms form at least a part of a wheel well for the plurality of tractive elements.

3. The lift device of claim 2, wherein the pendulum plates, the angled arms, and the carrier arm form the wheel well.

4. The lift device of claim 1, wherein each of the pendulum axle assemblies includes a pendulum actuator coupled between the pendulum plate and the pendulum linkage.

5. The lift device of claim 4, wherein each of the pendulum actuators is configured to independently adjust a distance between the carrier arm and the respective one of the tractive elements along a vertical direction.

6. The lift device of claim 4, wherein each of the pendulum actuators is arranged at a nonzero acute angle relative to the steering axis.

7. The lift device of claim 1, wherein each of the pendulum axle assemblies is configured to selectively adjust a distance between the carrier arm and the respective one of the tractive elements along a vertical direction, so that the pendulum axle assemblies each move between a stowed position and an elevated position.

8. The lift device of claim 1, wherein the turntable is rotatably coupled to the lift base by a turntable bearing, wherein the turntable bearing is arranged below a pivot plane defined by an uppermost point on the carrier arms.

9. A lift device, comprising:
- a lift base;
- a turntable supported on and rotatably coupled to the lift base;
- a boom assembly coupled to the turntable;

a platform coupled to the boom assembly so that the boom assembly is configured to selectively raise and lower the platform;

a carrier arm coupled to the lift base;

a tractive element coupled to the carrier arm, wherein the tractive element includes a dual-wheel assembly; and a pendulum axle assembly coupled between the carrier arm and the tractive element, the pendulum axle assembly includes a pendulum linkage that is pivotally coupled between the carrier arm and the dual-wheel assembly;

a pendulum plate coupled to the carrier arm; and an angled arm coupled between the pendulum plate and the pendulum linkage;

wherein the pendulum axle assembly defines a steering axis that is centered relative to the dual-wheel assembly, and wherein the carrier arm is directly coupled to the pendulum axle assembly at the steering axis.

10. The lift device of claim 9, wherein the pendulum axle assembly includes a pendulum actuator coupled between the pendulum plate and the pendulum linkage.

11. The lift device of claim 10, wherein the pendulum actuator is configured to independently adjust a distance between the carrier arm and the tractive element along a vertical direction.

12. The lift device of claim 9, wherein the pendulum axle assembly is configured to selectively adjust a distance between the carrier arm and the tractive element along a vertical direction, so that the pendulum axle assembly moves between a stowed position and an elevated position.

13. The lift device of claim 9, wherein the turntable is rotatably coupled to the lift base by a turntable bearing, wherein the turntable bearing is arranged below a pivot plane defined by an uppermost point on the carrier arm.

* * * * *